United States Patent
Iwashina et al.

(10) Patent No.: US 10,481,935 B2
(45) Date of Patent: *Nov. 19, 2019

(54) MANAGEMENT SYSTEM, OVERALL MANAGEMENT NODE, AND MANAGEMENT METHOD FOR MANAGING VIRTUALIZATION RESOURCES IN A MOBILE COMMUNICATION NETWORK

(71) Applicant: NTT DOCOMO, INC., Chiyoda-ku (JP)

(72) Inventors: Shigeru Iwashina, Chiyoda-ku (JP); Takashi Shimizu, Chiyoda-ku (JP); Motoshi Tamura, Chiyoda-ku (JP); Tetsuya Nakamura, Chiyoda-ku (JP); Hidenori Asaba, Chiyoda-ku (JP); Ashiq Khan, Chiyoda-ku (JP); Takahiro Yamazaki, Chiyoda-ku (JP); Takeo Yamasaki, Chiyoda-ku (JP); Joan Triay Marques, Munich (DE); David Perez Caparros, Munich (DE); Bertrand Souville, Munich (DE)

(73) Assignee: NTT DOCOMO, INC., Chiyoda-ku (JP)

( * ) Notice: Subject to any disclaimer, the term of this patent is extended or adjusted under 35 U.S.C. 154(b) by 235 days.

This patent is subject to a terminal disclaimer.

(21) Appl. No.: 15/108,439

(22) PCT Filed: Dec. 25, 2014

(86) PCT No.: PCT/JP2014/084306
§ 371 (c)(1),
(2) Date: Jun. 27, 2016

(87) PCT Pub. No.: WO2015/099036
PCT Pub. Date: Jul. 2, 2015

(65) Prior Publication Data
US 2016/0328258 A1    Nov. 10, 2016

(30) Foreign Application Priority Data

Dec. 27, 2013  (JP) ................................ 2013-272412

(51) Int. Cl.
*G06F 9/455*    (2018.01)
*G06F 9/46*    (2006.01)
(Continued)

(52) U.S. Cl.
CPC ........ *G06F 9/45558* (2013.01); *G06F 9/5077* (2013.01); *H04L 47/70* (2013.01);
(Continued)

(58) Field of Classification Search
None
See application file for complete search history.

(56) References Cited

U.S. PATENT DOCUMENTS 9,847,915 B2 * 12/2017 Ashwood-Smith ..... H04L 41/18
2011/0055398 A1    3/2011 Dehaan et al.
(Continued)

OTHER PUBLICATIONS

Extended European Search Report dated Dec. 16, 2016 in Patent Application No. 14875606.7.
(Continued)

*Primary Examiner* — Bradley A Teets
(74) *Attorney, Agent, or Firm* — Oblon, McClelland, Maier & Neustadt, L.L.P.

(57) ABSTRACT

A virtual server for executing a communication process is implemented on virtualization resources without being inefficient even when different virtualization resource management schemes are included. A management system included in a mobile communication system is configured to include an NFVI which is virtualization resources including a physical server in which a VNF to execute a communication process is generated and includes a VNFM for managing the VNF, a VIM for managing the virtualization resources of the
(Continued)

NFVI, and an orchestrator for managing all the virtualization resources of the NFVI, wherein the orchestrator includes a virtual server generation request section configured to input detailed information for implementing the VNF retained by the VNFM, rewrite the input detailed information according to a virtualization resource management scheme by the VIM, and request the VIM to generate the VNF.

6 Claims, 28 Drawing Sheets

(51) Int. Cl.
  *G06F 9/50* (2006.01)
  *H04L 12/911* (2013.01)
(52) U.S. Cl.
  CPC .............. *G06F 2009/45591* (2013.01); *G06F 2009/45595* (2013.01)

(56) References Cited

U.S. PATENT DOCUMENTS

2012/0131578 A1* 5/2012 Ciano ................. G06F 9/45558
                                                          718/1
2013/0058227 A1   3/2013 Lemieux
2016/0224409 A1*  8/2016 Liu ..................... H04L 41/0654
2016/0321112 A1* 11/2016 Iwashina ............... G06F 9/5072

OTHER PUBLICATIONS

Office Action dated Feb. 9, 2018 in corresponding European Patent Application No. 14 875 606.7, citing document AA therein, 8 pages.
International Preliminary Report on Patentability and Written Opinion dated Jul. 7, 2016 in PCT/JP2014/084306 filed Dec. 25, 2014.
European Telecommunications Standards Institute, "ETSI GS NFV 002 V1.1.1(Oct. 2013), [online],[retrieval date Mar. 16, 2015], URL:http://www.etsi.org/deliver/etsi_gs/nfv /001_099/002/01.01.01_ 60/gs_nfv002v010101p.pdf ", Internet, 2013, pp. 1-21.
Office Action dated Oct. 19, 2018 in European Application No. 14 875 606.7.
"Network Function Virtualization (NFV) Management and Orchestration; NFV-MAN001v005_marked_changes", ETSI Draft; NFV-MAN001V005_Marked_Changes, European Telecommunications Standards Institute (ETSI), 650, Route Des Lucioles; F-06921 Sophia-Antipolis; France, vol. ISG, No. V0.0.5, Sep. 17, 2013, p. 1-p. 47, XP014160063.
Office Action dated May 15, 2019 in European Patent Application No. 14875606.7.

* cited by examiner

| DC | AVAILABLE RESOURCE INFORMATION (VM) | | | AVAILABLE RESOURCE INFORMATION (NW) | | PROVIDED FUNCTION | T1 |
|---|---|---|---|---|---|---|---|
| | CPU PERFOR-MANCE | NUMBER OF AVAILABLE vCPUS | AVAILABLE MEMORY CAPACITY (PER VM) | AVAILABLE HDD CAPACITY (PER VM) | AVAILABLE BANDWIDTH | NUMBER OF AVAILABLE EXTERNAL ADDRESSES | |
| DC1 | High | 5000 | 4TB | 20TB | 100Gbps | 10000 | FUNCTION 1, FUNCTION 2, FUNCTION 3, FUNCTION 4 |
| DC2 | High | 5000 | 4TB | 20TB | 40Gbps | 10000 | FUNCTION 1, FUNCTION 2 |
| DC3 | Low | 1000 | 1TB | 10TB | 20Gbps | 10000 | FUNCTION 1, FUNCTION 2 |
| DC4 | Low | 1000 | 1TB | 10TB | 40Gbps | 10000 | FUNCTION 1, FUNCTION 2 |
| DC5 | High | 5000 | 4TB | 20TB | 100Gbps | 10000 | FUNCTION 1, FUNCTION 2, FUNCTION 3, FUNCTION 4 |

(b)

| DC | AVAILABLE RESOURCE INFORMATION (VM) | | | AVAILABLE RESOURCE INFORMATION (NW) | | PROVIDED FUNCTION | T8 |
|---|---|---|---|---|---|---|---|
| | CPU PERFOR-MANCE | NUMBER OF AVAILABLE vCPUS | AVAILABLE MEMORY CAPACITY (PER VM) | AVAILABLE HDD CAPACITY (PER VM) | AVAILABLE BANDWIDTH | NUMBER OF AVAILABLE EXTERNAL ADDRESSES | |
| DC2 | High | 5000 | 4TB | 20TB | 40Gbps | 10000 | FUNCTION 1, FUNCTION 2 |
| DC3 | Low | 1000 | 1TB | 10TB | 20Gbps | 10000 | FUNCTION 1, FUNCTION 2 |
| DC4 | Low | 1000 | 1TB | 10TB | 40Gbps | 10000 | FUNCTION 1, FUNCTION 2 |
| DC4 | Low | 1000 | 1TB | 10TB | 20Gbps | 10000 | - |

| COMMUNICATION SERVICE | CONFIGURATION VNF | T2 |
|---|---|---|
| COMMUNICATION SERVICE 1 | VNF10, VNF21 | |
| COMMUNICATION SERVICE 2 | VNF20 | |
| COMMUNICATION SERVICE 3 | VNF30 | |

(b)

| VNFM | MANAGEMENT TARGET VNF | T3 |
|---|---|---|
| VNFM1 | VNF10, VNF11 | |
| VNFM2 | VNF20, VNF21 | |
| VNFM3 | VNF30 | |

(c)

| VNF TYPE | ARRANGEABLE DC | T4 |
|---|---|---|
| VNF10 | DC2, DC3, DC5 | |
| VNF12 | DC2, DC3, DC4 | |
| VNF20 | DC2, DC3, DC4 | |
| VNF21 | DC1, DC4, DC5 | |
| VNF30 | DC5 | |

(d)

| VIM | VIM TYPE | MANAGEMENT TARGET DC | T6 |
|---|---|---|---|
| VIM1 | TYPE 1 | DC2, DC3 | |
| VIM2 | TYPE 2 | DC1, DC4 | |
| VIM3 | TYPE 1 | DC5 | |
| VIM-NW | — | NETWORK BETWEEN DCS | |

(e)

| TOPOLOGY INFORMATION (BANDWIDTH [bps], TRANSMISSION DELAY, CONNECTION STATE) BETWEEN DCS | DC1 | DC2 | DC3 | DC4 | DC5 | T5 |
|---|---|---|---|---|---|---|
| DC1 | | 10G SMALL DELAY CONNECTION OK | 5G SMALL DELAY CONNECTION OK | 10G SMALL DELAY CONNECTION OK | — | |
| DC2 | 10G SMALL DELAY CONNECTION OK | | 10G SMALL DELAY CONNECTION OK | — | 5G LARGE DELAY CONNECTION OK | |
| DC3 | 5G SMALL DELAY CONNECTION OK | 10G SMALL DELAY CONNECTION OK | | — | 5G LARGE DELAY CONNECTION OK | |
| DC4 | 10G SMALL DELAY CONNECTION OK | — | — | | 5G LARGE DELAY CONNECTION OK | |
| DC5 | — | 5G LARGE DELAY CONNECTION OK | 5G LARGE DELAY CONNECTION OK | 5G LARGE DELAY CONNECTION OK | | |

(f)

| PRIORITY | INDEX | T12 |
|---|---|---|
| 1 | BANDWIDTH BETWEEN DCS: LARGE | |
| 2 | CPU PERFORMANCE: HIGH | |
| 3 | VM MEMORY, VM STORAGE REGION: SMALL | |

| VNF | INTERNAL FUNCTIONAL SECTION | PERFOR- MANCE CONDI- TION | MODEL NUMBER | NECESSARY RESOURCE INFORMATION (VM) ||||| ARRANGEMENT/ STARTUP INFORMATION || NECESSARY RESOURCE INFORMATION (NW) |||| NECESSARY FUNCTION INFORMATION |
|---|---|---|---|---|---|---|---|---|---|---|---|---|---|---|---|
| | | | | CPU PERFOR- MANCE | NUMBER OF VMS | NUMBER OF vCPUS | VM MEMORY | VM STORAGE REGION | IMAGE FILE IDENTIFIER | PROCEDURE | NUMBER OF EXTERNAL ADDRESSES (PER VNF) ||| NW CONFIGU- RATION INFORMA- TION | |
| | | | | | | | | | | | FOR COMMUNI- CATION | BAND- WIDTH | FOR CONTROL | BAND- WIDTH | |
| VNF10 | VNFC100 | 100 | 001 | High | 1 | 2 | 32 GB | 300 GB | 000101000100 | ARRANGEMENT/ STARTUP PROCEDURE 10 OF INTERNAL FUNCTIONAL SECTION | 1 | 1Gbps | 1 | 100Mbps | INTERNAL NW INFORMA- TION 00 | FUNCTION 1, FUNCTION 2 |
| | | | 002 | Low | 2 | 1 | 32 GB | 300 GB | 000101000101 | | 1 | 1Gbps | 1 | 100Mbps | | FUNCTION 1, FUNCTION 2 |
| | | 500 | 003 | High | 1 | 2 | 128 GB | 500 GB | 000101000500 | | 1 | 1Gbps | 1 | 100Mbps | | FUNCTION 1, FUNCTION 2 |
| | | | 004 | Low | 2 | 1 | 128 GB | 300 GB | 000101000501 | REDUCTION PROCEDURE 10 | 1 | 1Gbps | 1 | 100Mbps | | FUNCTION 1, FUNCTION 2 |
| | VNFC101 | 100 | 005 | High | 1 | 2 | 32 GB | 500 GB | 000101010100 | | 0 | - | - | - | INTERNAL NW INFORMA- TION 01 | FUNCTION 2 |
| | | | 006 | Low | 2 | 2 | 16 GB | 300 GB | 000101010101 | | 0 | - | - | - | | FUNCTION 2 |
| | | 500 | 007 | High | 3 | 2 | 256 GB | 2000 GB | 000101010500 | | 0 | - | - | - | | FUNCTION 2 |
| | | | 008 | Low | 6 | 2 | 256 GB | 1000 GB | 000101010501 | | 0 | - | - | - | | FUNCTION 2 |

| DC | COMBI-NATION | MODEL NUMBER | NECESSARY VM RESOURCES ||||| NECESSARY NW RESOURCES ||||
|---|---|---|---|---|---|---|---|---|---|---|
| | | | CPU PERFOR-MANCE | NUMBER OF VMs | NUMBER OF vCPUS | VM MEMORY | VM STORAGE REGION | NUMBER OF EXTERNAL ADDRESSES (PER VNF) ||| BAND-WIDTH |
| | | | | | | | | FOR COMMUNI-CATION | BAND-WIDTH | FOR CONTROL | |
| DC2 | 1 | 002 | Low | 2 | 1 | 32 GB | 300 GB | 1 | 1Gbps | 1 | 100Mbps |
| | | 006 | Low | 2 | 2 | 16 GB | 300 GB | 0 | - | 0 | - |
| | 2 | 001 | High | 1 | 2 | 32 GB | 300 GB | 1 | 1Gbps | 1 | 100Mbps |
| | | 005 | High | 1 | 2 | 32 GB | 500 GB | 0 | - | 0 | - |
| | 3 | 001 | High | 1 | 2 | 32 GB | 300 GB | 1 | 1Gbps | 1 | 100Mbps |
| | | 006 | Low | 2 | 2 | 16 GB | 300 GB | 0 | - | 0 | - |
| | 4 | 002 | Low | 2 | 1 | 32 GB | 300 GB | 1 | 1Gbps | 1 | 100Mbps |
| | | 005 | High | 1 | 2 | 32 GB | 500 GB | 0 | - | 0 | - |
| DC3 | 1 | 002 | Low | 2 | 1 | 32 GB | 300 GB | 1 | 1Gbps | 1 | 100Mbps |
| | | 006 | Low | 2 | 2 | 16 GB | 300 GB | 0 | - | 0 | - |

(b)

T13

| PRIORITY | DC | COMBI-NATION | MODEL NUMBER | NECESSARY VM RESOURCES ||||| NECESSARY NW RESOURCES ||||
|---|---|---|---|---|---|---|---|---|---|---|---|
| | | | | CPU PERFOR-MANCE | NUMBER OF VMs | NUMBER OF vCPUS | VM MEMORY | VM STORAGE REGION | NUMBER OF EXTERNAL ADDRESSES (PER VNF) ||| BAND-WIDTH |
| | | | | | | | | | FOR COMMUNI-CATION | BAND-WIDTH | FOR CONTROL | |
| 4 | DC2 | 1 | 002 | Low | 2 | 1 | 32 GB | 300 GB | 1 | 1Gbps | 1 | 100Mbps |
| | | | 006 | Low | 2 | 2 | 16 GB | 300 GB | 0 | - | 0 | - |
| 1 | | 2 | 001 | High | 1 | 2 | 32 GB | 300 GB | 1 | 1Gbps | 1 | 100Mbps |
| | | | 005 | High | 1 | 2 | 32 GB | 500 GB | 0 | - | 0 | - |
| 2 | | 3 | 001 | High | 1 | 2 | 32 GB | 300 GB | 1 | 1Gbps | 1 | 100Mbps |
| | | | 006 | Low | 2 | 2 | 16 GB | 300 GB | 0 | - | 0 | - |
| 3 | | 4 | 002 | Low | 2 | 1 | 32 GB | 300 GB | 1 | 1Gbps | 1 | 100Mbps |
| | | | 005 | High | 1 | 2 | 32 GB | 500 GB | 0 | - | 0 | - |
| 5 | DC3 | 1 | 002 | Low | 2 | 1 | 32 GB | 300 GB | 1 | 1Gbps | 1 | 100Mbps |
| | | | 006 | Low | 2 | 2 | 16 GB | 300 GB | 0 | - | 0 | - |

| MODEL NUMBER | NECESSARY RESOURCE INFORMATION (VM) | | | | NECESSARY RESOURCE INFORMATION (NW) | | | |
|---|---|---|---|---|---|---|---|---|
| | CPU PERFOR-MANCE | NUMBER OF VMS | NUMBER OF vCPUS | VM MEMORY | VM STORAGE REGION | NUMBER OF EXTERNAL ADDRESSES (PER VNF) | | |
| | | | | | | FOR COMMUNI-CATION | BAND-WIDTH | FOR CONTROL | BAND-WIDTH |

| MODEL NUMBER | CPU PERFOR-MANCE | NUMBER OF VMS | NUMBER OF vCPUS | VM MEMORY | VM STORAGE REGION | FOR COMMUNI-CATION | BAND-WIDTH | FOR CONTROL | BAND-WIDTH |
|---|---|---|---|---|---|---|---|---|---|
| 001 | High | 1 | 2 | 32 GB | 300 GB | 1 | 1Gbps | 1 | 100Mbps |
| 005 | High | 1 | 2 | 32 GB | 500 GB | 0 | - | 0 | - |

(b)

T15

| VM IDENTIFI-CATION NUMBER | NECESSARY RESOURCE INFORMATION (VM) | | | | ARRANGEMENT/ STARTUP INFORMATION | | NECESSARY NW RESOURCES (NW) | | | | NW CONFIGURATION INFORMATION |
|---|---|---|---|---|---|---|---|---|---|---|---|
| | CPU PERFOR-MANCE | NUMBER OF VMS | NUMBER OF vCPUS | VM MEMORY | VM STORAGE REGION | IMAGE FILE IDENTIFIER | PROCEDURE | NUMBER OF EXTERNAL ADDRESSES (PER VNF) | | | |
| | | | | | | | | FOR COMMUNI-CATION | BAND-WIDTH | FOR CONTROL | BAND-WIDTH | |

| VM IDENTIFI-CATION NUMBER | CPU PERFOR-MANCE | NUMBER OF VMS | NUMBER OF vCPUS | VM MEMORY | VM STORAGE REGION | IMAGE FILE IDENTIFIER | PROCEDURE | FOR COMMUNI-CATION | BAND-WIDTH | FOR CONTROL | BAND-WIDTH | NW CONFIGURATION INFORMATION |
|---|---|---|---|---|---|---|---|---|---|---|---|---|
| VM_001 | High | 1 | 2 | 32 GB | 300 GB | 000101000100 | ARRANGEMENT /STARTUP PROCEDURE 10 OF INTERNAL FUNCTIONAL SECTION | 1 | 1Gbps | 1 | 100Mbps | INTERNAL NW INFORMATION 00 |
| VM_002 | High | 1 | 2 | 32 GB | 500 GB | 000101010100 | | 0 | - | 0 | - | INTERNAL NW INFORMATION 01 |

| RESERVATION NUMBER | DC NUMBER | VM IDENTIFICATION NUMBER | HW IDENTIFIER | RESOURCE INFORMATION (VM) | | | RESOURCE INFORMATION (NW) | |
|---|---|---|---|---|---|---|---|---|
| | | | | NUMBER OF vCPUS | VM MEMORY | VM STORAGE REGION | FOR COMMUNICATION | FOR CONTROL |
| | | | | | | | EXTERNAL IP ADDRESS 01 | EXTERNAL IP ADDRESS 02 |
| RESERVATION NUMBER 1 | DC2 | VM_001 | HW1 | 2 | 32 GB | 300 GB | - | - |
| | | VM_002 | HW2 | 2 | 32 GB | 500 GB | - | - |

(b) T25

| VM IDENTIFICATION INFORMATION | RESOURCE INFORMATION (NW) | | CORRESPONDING INTERNAL FUNCTIONAL SECTION | CPU PERFORMANCE |
|---|---|---|---|---|
| | FOR COMMUNICATION | FOR CONTROL | | |
| | EXTERNAL IP ADDRESS 01 | EXTERNAL IP ADDRESS 02 | | |
| VM_001 | - | - | VNFC100 | High |
| VM_002 | - | - | VNFC101 | High |

(c) T26

| SERVICE ID | VNF TYPE | VNF IDENTIFICATION NUMBER | VM IDENTIFICATION NUMBER | CORRESPONDING INTERNAL FUNCTIONAL SECTION | CPU PERFORMANCE |
|---|---|---|---|---|---|
| SERVICE ID1 | VNF10 | VNF_001 | VM_001 | VNFC100 | High |
| SERVICE ID1 | VNF10 | VNF_001 | VM_002 | VNFC101 | High |

(f) T30

| SERVICE ID | VNF TYPE | VNF IDENTIFICATION NUMBER | VM IDENTIFICATION NUMBER | CORRESPONDING INTERNAL FUNCTIONAL SECTION | CPU PERFORMANCE |
|---|---|---|---|---|---|
| SERVICE ID1 | VNF21 | VNF_021 | VM_210 | VNFC210 | Low |

(g) T42

| SERVICE ID | VNF TYPE | VNF IDENTIFICATION NUMBER | VM IDENTIFICATION NUMBER | CORRESPONDING INTERNAL FUNCTIONAL SECTION | CPU PERFORMANCE |
|---|---|---|---|---|---|
| SERVICE ID1 | VNF10 | VNF_010 | VM_1002 | VNFC100 | High |
| | | | VM_1003 | VNFC101 | High |
| | | | VM_1012 | VNFC100 | Low |
| | | | VM_1013 | VNFC101 | Low |

(d) T27

| SERVICE ID | VNF TYPE | VNF IDENTIFICATION NUMBER | VIM IDENTIFICATION NUMBER | RESERVATION NUMBER DURING GENERATION | DC NUMBER | NW INFORMATION | | VM IDENTIFICATION NUMBER |
|---|---|---|---|---|---|---|---|---|
| | | | | | | FOR COMMUNICATION | FOR CONTROL | |
| | | | | | | EXTERNAL IP ADDRESS 01 | EXTERNAL IP ADDRESS 02 | |
| SERVICE ID1 | VNF10 | VNF_001 | VIM1 | RESERVATION NUMBER 1 | DC2 | - | - | VM_001 |
| SERVICE ID1 | VNF10 | VNF_001 | VIM1 | RESERVATION NUMBER 1 | DC2 | - | - | VM_002 |

(e) T28

| SERVICE ID | VNF TYPE | VNF IDENTIFICATION NUMBER | VIM IDENTIFICATION NUMBER | RESERVATION NUMBER DURING GENERATION | DC NUMBER | NW INFORMATION | | VM IDENTIFICATION NUMBER |
|---|---|---|---|---|---|---|---|---|
| | | | | | | FOR COMMUNICATION | FOR CONTROL | |
| | | | | | | EXTERNAL IP ADDRESS 20 | EXTERNAL IP ADDRESS 21 | |
| SERVICE ID1 | VNF21 | VNF_021 | VIM1 | RESERVATION NUMBER 2 | DC2 | - | - | VM_210 |

| SERVICE ID | REQUEST | | | | RESPONSE | | |
|---|---|---|---|---|---|---|---|
| | PERFORMANCE CONDITION | NW CONDITION | VNF TYPE | VNF IDENTIFIER | PERFORMANCE | NW INFORMATION | |
| | | | | | | FOR COMMUNICATION | FOR CONTROL |
| SERVICE ID1 | 100 | DC1 CONNECTION, 5 Gbps | VNF10 | VNF_001 | 100 | EXTERNAL IP ADDRESS 01 | EXTERNAL IP ADDRESS 02 |
| SERVICE ID1 | 100 | DC1 CONNECTION, 5 Gbps | VNF21 | VNF_021 | 100 | EXTERNAL IP ADDRESS 20 | EXTERNAL IP ADDRESS 21 |

(b)

T40

| SERVICE ID | VNF TYPE | VNF IDENTIFICATION NUMBER | VIM IDENTIFICATION NUMBER | RESERVATION NUMBER DURING GENERATION | DC NUMBER | NW INFORMATION | | VM IDENTIFICATION NUMBER |
|---|---|---|---|---|---|---|---|---|
| | | | | | | FOR COMMUNICATION | FOR CONTROL | |
| SERVICE ID1 | VNF10 | VNF_001 | VIM1 | RESERVATION NUMBER 1 | DC2 | EXTERNAL IP ADDRESS 01 | EXTERNAL IP ADDRESS 02 | VM_001 |
| | | | | | | | | VM_002 |
| | | VNF_010 | VIM1 | RESERVATION NUMBER 10 | DC3 | EXTERNAL IP ADDRESS 11 | - | VM_1002 |
| | | | | | | | | VM_1003 |
| | | | | | | | | VM_1012 |
| | | | | | | | | VM_1013 |
| | VNF21 | VNF_021 | VIM1 | RESERVATION NUMBER 2 | DC2 | EXTERNAL IP ADDRESS 20 | EXTERNAL IP ADDRESS 21 | VM_210 |

(c)

T20

| COMBINATION NUMBER | MODEL NUMBER | NECESSARY VM RESOURCES | | | | | NECESSARY NW RESOURCES | | | | NECESSARY FUNCTION INFORMATION |
|---|---|---|---|---|---|---|---|---|---|---|---|
| | | CPU PERFORMANCE | NUMBER OF VMS | NUMBER OF vCPUS | VM MEMORY | VM STORAGE REGION | NUMBER OF EXTERNAL ADDRESSES (PER VNF) | | BANDWIDTH | BANDWIDTH | |
| | | | | | | | FOR COMMUNICATION | FOR CONTROL | | | |
| 1 | 002 | Low | 2 | 1 | 32 GB | 300 GB | 1 | 1 | 1Gbps | 100Mbps | FUNCTION 1, FUNCTION 2 |
| | 006 | Low | 2 | 2 | 16 GB | 300 GB | 0 | 0 | - | - | FUNCTION 2 |
| 2 | 001 | High | 1 | 2 | 32 GB | 300 GB | 1 | 1 | 1Gbps | 100Mbps | FUNCTION 1, FUNCTION 2 |
| | 005 | High | 1 | 2 | 32 GB | 500 GB | 0 | 0 | - | - | FUNCTION 2 |
| 3 | 001 | High | 1 | 2 | 32 GB | 300 GB | 1 | 1 | 1Gbps | 100Mbps | FUNCTION 1, FUNCTION 2 |
| | 006 | Low | 2 | 2 | 16 GB | 300 GB | 0 | 0 | - | - | FUNCTION 2 |
| 4 | 002 | Low | 2 | 1 | 32 GB | 300 GB | 1 | 1 | 1Gbps | 100Mbps | FUNCTION 1, FUNCTION 2 |
| | 005 | High | 1 | 2 | 32 GB | 500 GB | 0 | 0 | - | - | FUNCTION 2 |

| DC | CPU PERFOR-MANCE | AVAILABLE RESOURCE INFORMATION (VM) | | | AVAILABLE RESOURCE INFORMATION (NW) | |
|---|---|---|---|---|---|---|
| | | NUMBER OF AVAILABLE vCPUS | AVAILABLE MEMORY CAPACITY (PER VM) | AVAILABLE HDD CAPACITY (PER VM) | AVAILABLE BANDWIDTH | NUMBER OF AVAILABLE EXTERNAL ADDRESSES |
| DC3 | Low | 1000 | 1TB | 10TB | 40Gbps | 10000 |
| DC5 | High | 5000 | 4TB | 20TB | 100Gbps | 10000 |

| | PROVIDED FUNCTION |
|---|---|
| | FUNCTION 1, FUNCTION 2 |
| | FUNCTION 1, FUNCTION 2, FUNCTION 3, FUNCTION 4 |

T31

(b)

| DC | COMBI-NATION | MODEL NUMBER | NECESSARY VM RESOURCES | | | | | NECESSARY NW RESOURCES | | | |
|---|---|---|---|---|---|---|---|---|---|---|---|
| | | | CPU PERFOR-MANCE | NUMBER OF VMS | NUMBER OF vCPUS | VM MEMORY | VM STORAGE REGION | NUMBER OF EXTERNAL ADDRESSES (PER VNF) | | BAND-WIDTH | BAND-WIDTH |
| | | | | | | | | FOR COMMUNI-CATION | FOR CONTROL | | |
| DC3 | 1 | 002 | Low | 2 | 1 | 32 GB | 300 GB | 1 | 1 | 1Gbps | 100Mbps |
| | | 006 | Low | 2 | 2 | 16 GB | 300 GB | 0 | - | - | - |
| DC5 | 1 | 001 | High | 1 | 2 | 32 GB | 300 GB | 1 | 1 | 1Gbps | 100Mbps |
| | | 005 | High | 1 | 2 | 32 GB | 500 GB | 0 | - | - | - |

T32

(c)

| PRIORITY | DC | COMBI-NATION | MODEL NUMBER | NECESSARY VM RESOURCES | | | | | NECESSARY NW RESOURCES | | | |
|---|---|---|---|---|---|---|---|---|---|---|---|---|
| | | | | CPU PERFOR-MANCE | NUMBER OF VMS | NUMBER OF vCPUS | VM MEMORY | VM STORAGE REGION | NUMBER OF EXTERNAL ADDRESSES (PER VNF) | | BAND-WIDTH | BAND-WIDTH |
| | | | | | | | | | FOR COMMUNI-CATION | FOR CONTROL | | |
| 1 | DC3 | 1 | 002 | Low | 2 | 1 | 32 GB | 300 GB | 1 | 1 | 1Gbps | 100Mbps |
| | | | 006 | Low | 2 | 2 | 16 GB | 300 GB | 0 | - | - | - |
| 2 | DC5 | 1 | 001 | High | 1 | 2 | 32 GB | 300 GB | 1 | 1 | 1Gbps | 100Mbps |
| | | | 005 | High | 1 | 2 | 32 GB | 500 GB | 0 | - | - | - |

| MODEL NUMBER | NECESSARY RESOURCE INFORMATION (VM) | | | | NECESSARY RESOURCE INFORMATION (NW) | | | |
|---|---|---|---|---|---|---|---|---|
| | CPU PERFOR-MANCE | NUMBER OF VMS | NUMBER OF vCPUS | VM MEMORY | VM STORAGE REGION | NUMBER OF EXTERNAL ADDRESSES (PER VNF) | | |
| | | | | | | FOR COMMUNI-CATION | BAND-WIDTH | FOR CONTROL | BAND-WIDTH |
| 002 | Low | 2 | 1 | 32 GB | 300 GB | 1 | 1Gbps | 1 | 100Mbps |
| 006 | Low | 2 | 2 | 16 GB | 300 GB | 0 | - | - | - |

(b)                                                                                                   T35

| NECESSARY RESOURCE INFORMATION (VM) | | | | | ARRANGEMENT/STARTUP INFORMATION | | NECESSARY RESOURCE INFORMATION (NW) | | | | |
|---|---|---|---|---|---|---|---|---|---|---|---|
| CPU PERFOR-MANCE | VM IDENTIFI-CATION NUMBER | NUMBER OF vCPUS | VM MEMORY | VM STORAGE REGION | IMAGE FILE IDENTIFIER | PROCEDURE | NUMBER OF EXTERNAL ADDRESSES (PER VNF) | | | | NW CONFIGURA-TION INFORMATION |
| | | | | | | | FOR COMMUNI-CATION | BAND-WIDTH | FOR CONTROL | BAND-WIDTH | |
| Low | VM_1002 | 1 | 32 GB | 300 GB | 000101000101 | ARRANGEMENT /STARTUP PROCEDURE 10 OF INTERNAL FUNCTIONAL SECTION | 1 | 1Gbps | 1 | 1 | INTERNAL NW INFORMATION 00 |
| Low | VM_1003 | 1 | 32 GB | 300 GB | | | 0 | - | - | 0 | |
| Low | VM_1012 | 2 | 16 GB | 300 GB | 000101010101 | | 0 | - | - | 0 | INTERNAL NW INFORMATION 01 |
| Low | VM_1013 | 2 | 16 GB | 300 GB | | | 0 | - | - | 0 | |

(c)                                                     T36

| VM IDENTIFICATION INFORMATION | NW INFORMATION | |
|---|---|---|
| | FOR COMMUNICATION | FOR CONTROL |
| VM_1002 | EXTERNAL IP ADDRESS 10 | EXTERNAL IP ADDRESS 11 |
| VM_1003 | - | - |
| VM_1012 | - | - |
| VM_1013 | - | - |

Fig.13

| SERVICE ID | REQUEST | | RESPONSE | | | | |
|---|---|---|---|---|---|---|---|
| | PERFORMANCE CONDITION | NW CONDITION | VNF TYPE | VNF IDENTIFICATION NUMBER | PERFORMANCE | NW INFORMATION | |
| | | | | | | FOR COMMUNICATION | FOR CONTROL |
| SERVICE ID1 | 100 | DC1 CONNECTION, 5 Gbps | VNF10 | VNF_001 | 100 | EXTERNAL IP ADDRESS 01 | EXTERNAL IP ADDRESS 02 |
| | 100 | DC1 CONNECTION, 5 Gbps | VNF21 | VNF_210 | 100 | EXTERNAL IP ADDRESS 20 | EXTERNAL IP ADDRESS 21 |
| | 100 | OTHER DC | VNF10 | VNF_010 | 100 | EXTERNAL IP ADDRESS 10 | EXTERNAL IP ADDRESS 11 |

| RESERVA-TION NUMBER | DC NUMBER | VM IDENTIFI-CATION NUMBER | HW IDENTIFIER | RESOURCE INFORMATION (VM) ||| RESOURCE INFORMATION (NW) ||
|---|---|---|---|---|---|---|---|---|
| | | | | NUMBER OF vCPUS | VM MEMORY | VM STORAGE REGION | FOR COMMUNICATION | FOR CONTROL |
| RESERVA-TION NUMBER 10 | DC3 | VM_1002 | HW10 | 1 | 32 GB | 300 GB | EXTERNAL IP ADDRESS 01 | EXTERNAL IP ADDRESS 11 |
| | | VM_1003 | HW11 | 1 | 32 GB | 300 GB | - | - |
| | | VM_1012 | HW12 | 2 | 16 GB | 300 GB | - | - |
| | | VM_1013 | HW13 | 2 | 16 GB | 300 GB | - | - |

| MODEL NUMBER | INTERNAL FUNCTIONAL SECTION | NUMBER OF COMPONENTS WITHIN INTERNAL FUNCTIONAL SECTION WITHIN VNF | |
|---|---|---|---|
| | | MINIMUM NUMBER OF COMPONENTS | UPPER-LIMIT NUMBER |
| VNF10 | VNFC100 | 1 | 2 |
| | VNFC101 | 1 | 6 |

TX (b)

| MODEL TYPE | PERFOR-MANCE CONDITION | CPU PERFOR-MANCE | NUMBER OF VMS | | VM MEMORY | | VM STORAGE REGION | | ARRANGEMENT/STARTUP INFORMATION | | NUMBER OF EXTERNAL ADDRESSES | | | NW CONFIGURATION INFORMATION | NECESSARY FUNCTION INFORMATION |
|---|---|---|---|---|---|---|---|---|---|---|---|---|---|---|---|
| | | | VNFC 100 | VNFC 101 | VNFC 100 | VNFC 101 | VNFC 100 | VNFC 101 | IMAGE FILE IDENTIFIER | PROCEDURE | FOR COMMUNI-CATION | BAND-WIDTH | FOR CONTROL | BAND-WIDTH | | |
| 101 | 100 | Low | 0 | ±1 | - | 16 GB | - | 300 GB | 00010300101010200 | ARRANGEMENT/STARTUP PROCEDURE 20 REDUCTION PROCEDURE 20 | - | - | - | - | INTERNAL NW INFORMATION 20 | FUNCTION 2 |
| 102 | 200 | Low | 0 | ±2 | - | 16 GB | - | 300 GB | 00010300101010201 | ARRANGEMENT/STARTUP PROCEDURE 21 REDUCTION PROCEDURE 21 | - | - | - | - | INTERNAL NW INFORMATION 21 | FUNCTION 2 |
| 103 | 300 | Low | 0 | ±3 | - | 16 GB | - | 300 GB | 00010300101010202 | ARRANGEMENT/STARTUP PROCEDURE 22 REDUCTION PROCEDURE 22 | - | - | - | - | INTERNAL NW INFORMATION 22 | FUNCTION 2 |
| 104 | 400 | Low | 0 | ±4 | - | 16 GB | - | 300 GB | 00010300101010203 | ARRANGEMENT/STARTUP PROCEDURE 23 REDUCTION PROCEDURE 23 | - | - | - | - | INTERNAL NW INFORMATION 23 | FUNCTION 2 |
| 105 | 200 | High | 0 | ±1 | - | 128 GB | - | 500 GB | 00010300101010204 | ARRANGEMENT/STARTUP PROCEDURE 24 REDUCTION PROCEDURE 24 | - | - | - | - | INTERNAL NW INFORMATION 24 | FUNCTION 2 |
| 106 | 400 | High | 0 | ±2 | - | 128 GB | - | 500 GB | 00010300101010205 | ARRANGEMENT/STARTUP PROCEDURE 25 REDUCTION PROCEDURE 25 | - | - | - | - | INTERNAL NW INFORMATION 25 | FUNCTION 2 |
| 107 | 200 | High | ±1 | ±1 | 32 GB | 128 GB | 500 GB | 500 GB | 00010300101010206 | ARRANGEMENT/STARTUP PROCEDURE 26 REDUCTION PROCEDURE 26 | - | - | - | - | INTERNAL NW INFORMATION 26 | FUNCTION 1, FUNCTION 2 |
| 108 | 400 | High | ±1 | ±2 | 32 GB | 128 GB | 500 GB | 500 GB | 00010300101010207 | ARRANGEMENT/STARTUP PROCEDURE 27 REDUCTION PROCEDURE 27 | - | - | - | - | INTERNAL NW INFORMATION 27 | FUNCTION 1, FUNCTION 2 |
| 109 | 600 | High | ±1 | ±3 | 32 GB | 128 GB | 500 GB | 500 GB | 00010300101010208 | ARRANGEMENT/STARTUP PROCEDURE 28 REDUCTION PROCEDURE 28 | - | - | - | - | INTERNAL NW INFORMATION 28 | FUNCTION 1, FUNCTION 2 |
| 110 | 800 | High | ±1 | ±4 | 32 GB | 128 GB | 500 GB | 500 GB | 00010300101010209 | ARRANGEMENT/STARTUP PROCEDURE 29 REDUCTION PROCEDURE 29 | - | - | - | - | INTERNAL NW INFORMATION 29 | FUNCTION 1, FUNCTION 2 |
| 111 | 1000 | High | ±1 | ±5 | 32 GB | 128 GB | 500 GB | 500 GB | 00010300101010210 | ARRANGEMENT/STARTUP PROCEDURE 30 REDUCTION PROCEDURE 30 | - | - | - | - | INTERNAL NW INFORMATION 30 | FUNCTION 1, FUNCTION 2 |

| INCREASE/ DECREASE UNIT | OSS | ORCHESTRATOR | VNFM | VIM | EMBODIMENT |
|---|---|---|---|---|---|
| SERVICE | INSTRUCT ORCHESTRATOR TO PERFORM INCREASE/ DECREASE IN ONLY SERVICE ID AND PERFORMANCE CONDITION FROM OSS | 1. SPECIFY CORRESPONDING VNF USING TABLE T2 FROM SERVICE ID AND PERFORMANCE CONDITION 2. SPECIFY VNFM WHICH IS MANAGEMENT FUNCTION OF CORRESPONDING VNF FROM TABLE T3 AND INSTRUCT INCREASE/DECREASE OF VNF | 1. CREATE VNF CONFIGURATION PLAN MATCHING CONDITION USING TABLE T9 FROM SERVICE ID AND PERFORMANCE CONDITION 2. INSTRUCT VIM TO INCREASE VNF (VM) VIA ORCHESTRATOR OR DIRECTLY USING VNF DETAILED INFORMATION OF TABLE T9 AFTER RESERVATION OF RESOURCES VIA ORCHESTRATOR | 1. RESERVE RESOURCES ON BASIS OF INSTRUCTION FROM ORCHESTRATOR 2. PERFORM INCREASE/ DECREASE OF VM (VNF OR VNFC) ON RESERVED RESOURCES ON BASIS OF INSTRUCTION OF ORCHESTRATOR OR VIM | ENHANCEMENT (CREATION AS INITIAL GENERATION) • PROCESS ILLUSTRATED IN FIGS. 15 AND 16 (PROCEDURE) |
| VNF | INSTRUCT ORCHESTRATOR TO PERFORM INCREASE/ DECREASE IN SERVICE ID, VNF IDENTIFICATION NUMBER, AND PERFORMANCE CONDITION OF VNF FROM OSS | 1. SPECIFY CORRESPONDING VNF USING INFORMATION (TABLE T21, ETC.) OF VNF DURING GENERATION TO BE RETAINED FROM SERVICE ID, VNF IDENTIFICATION NUMBER, AND PERFORMANCE CONDITION OF VNF 2. SPECIFY VNFM WHICH IS MANAGEMENT FUNCTION OF CORRESPONDING VNF FROM TABLE T3 AND INSTRUCT INCREASE/DECREASE OF VNF | 1. CONFIRM WHETHER INCREASE/DECREASE WITHIN VNF IS POSSIBLE USING INFORMATION (TABLE T18, ETC.) OF VNF DURING GENERATION TO BE RETAINED AND TABLE TX FROM SERVICE ID AND VNF IDENTIFICATION NUMBER AND DETERMINE INCREASE/DECREASE IN UNITS OF VNFS DUE TO IMPOSSIBLE INTERNAL INCREASE/ DECREASE 2. CREATE VNF INCREASE/DECREASE PLAN MATCHING PERFORMANCE CONDITION USING TABLE T9 3. INSTRUCT VIM TO INCREASE/DECREASE VNF (VM) VIA ORCHESTRATOR OR DIRECTLY USING VNF DETAILED INFORMATION OF TABLE T9 | | ENHANCEMENT • PROCESS ILLUSTRATED IN FIGS. 19 AND 20 (PROCEDURE) PROCESS ILLUSTRATED IN FIGS. 17 AND 18 (PROCEDURE) REDUCTION • PROCESS ILLUSTRATED IN FIGS. 21 AND 22 (PROCEDURE) |
| VNFC | | | 1. CONFIRM WHETHER INCREASE/DECREASE WITHIN VNF IS POSSIBLE USING INFORMATION (TABLE T18, ETC.) OF VNF DURING GENERATION TO BE RETAINED AND TABLE TX FROM SERVICE ID AND VNF IDENTIFICATION NUMBER AND DETERMINE INCREASE/DECREASE IN UNITS OF VNFCS DUE TO POSSIBLE INTERNAL INCREASE/ DECREASE 2. CREATE INCREASE/DECREASE VNFC CONFIGURATION PLAN FROM TABLE TY 3. THEREAFTER, IT IS READ THAT VNFC IDENTIFICATION NUMBER IS ALSO INCLUDED IN VNF IDENTIFICATION NUMBER AND IT IS SIMILAR TO INCREASE/DECREASE IN UNITS OF VNFS | | • PROCESS ILLUSTRATED IN FIGS. 24 AND 25 (PROCEDURE) |

MANAGEMENT SYSTEM, OVERALL MANAGEMENT NODE, AND MANAGEMENT METHOD FOR MANAGING VIRTUALIZATION RESOURCES IN A MOBILE COMMUNICATION NETWORK

TECHNICAL FIELD

The present invention relates to a management system related to management of a communication system, an overall management node, and a management method.

BACKGROUND ART

Conventionally, a computer operates as a virtual machine (VM) according to server virtualization technology for various purposes. Also, according to this technology, designating a node in a core network of a mobile communication network as the virtual machine is being investigated (for example, see Non-Patent Literature 1).

CITATION LIST

Non-Patent Literature

[Non-Patent Literature 1] ETSI Group Specification (ETSI GS NFV 002 v1.1.1 (2013. 10)) Network Functions Virtualization (NFV); Architectural Framework

SUMMARY OF INVENTION

Technical Problem

A node in a core network of a mobile communication network is implemented, for example, by a virtual network function (VNF) which is a communication function virtualized in virtual machine(s). Management of the above-described mobile communication network by three functional entities of a VNF manager (VNFM), a virtual infrastructure manager (VIM), and an orchestrator is considered. The VNFM has a function of retaining detailed information for implementing the VNF in the virtual machine(s) and managing the VNF. The VIM monitors a state of a physical server (physical server and virtualization resources) on which virtual machine(s) is implemented and generates and deletes the virtual machine(s) and the VNF on the physical server according to control from the VNFM or the orchestrator.

Also, a plurality of physical servers are generally collectively arranged in a data center and the VIM performs a process for a physical server group installed in one or more data centers. Also, the management (resource management) of the physical server group in the data center is performed in a different mounting scheme such as OPENSTACK (registered trademark) or vCenter. The VIM is provided in each mounting scheme in the data center. The orchestrator performs the overall resource management across a plurality of VIMs.

An internal structure of a node (communication node) constituting a mobile communication network that is not currently virtualized differs according to a vendor who provides the node. The internal structure becomes the design know-how of each vendor.

When this node is virtualized as the VNF, the VIM reserves virtualization resources and then generates virtual machine(s) on the reserved virtualization resources and generates the VNF in the virtual machine(s). Also, detailed information retained by the VNFM for implementing the VNF in the virtual machine(s) is necessary to generate the VNF in the virtual machine(s). The detailed information corresponds to the above-described internal structure of a node which is not virtualized and includes the design know-how of each vendor.

The VIM must receive the request of generation of the VNF based on detailed information retained in the VNFM in order to generate the VNF in virtual machine(s). Also, it is necessary to request the generation of the VNF according to the above-described data center mounting scheme such as OPENSTACK or vCenter (a virtualization resource management scheme).

Here, the VNFM is generally provided from a vendor for each VNF. Accordingly, in view of the face that the VNFM requests the generation of VNF, all VNFMs must have a function of requesting the generation of the VNF in a format according to the virtualization resource management scheme. That is, it is necessary to support (Number of VIM schemes×Number of VNFMs) mounting patterns and inefficiency may be caused.

The present invention has been made in view of the above-described circumstances and an objective of the invention is to provide a management system, an overall management node, and a management method capable of implementing a virtual server for executing a communication process on virtualization resources without being inefficient even when different virtualization resource management schemes are included.

Solution to Problem

To accomplish the above-described objective, a management system according to an embodiment of the present invention is a management system which is included in a communication system configured to include virtualization resources including a physical server in which a virtual server for executing a communication process is generated and which includes a virtual communication-function management node for managing a function of executing the communication process provided in the virtual server, a plurality of virtualization resource management nodes for managing the virtualization resources in different schemes, and an overall management node for managing all the virtualization resources, wherein the virtualization resource management node includes: a monitoring means configured to monitor a use state of the virtualization resources; a reservation means configured to perform reservation by receiving a request of the reservation of necessary resources for generation of the virtual server among the virtualization resources; and a virtual server generation means configured to generate the virtual server by receiving a request for generating the virtual server on the necessary resources for the generation of the virtual server reserved by the reservation means, wherein the virtual communication-function management node includes: a retention means configured to retain detailed information for implementing the virtual server on the virtualization resources; and a detailed information output means configured to output the detailed information retained in the retention means to the overall management node, wherein the overall management node includes: a request reception means configured to receive a request related to a function of the communication process accompanied by the generation of the virtual server in the physical server, and a virtual server generation request means configured to input the detailed information from the virtual communication-function management node, rewrite the input detailed information according to a virtualization resource management scheme by the virtualization resource management node, and request the virtualization resource management node to generate the virtual server on the necessary resources reserved by the reservation means using the rewritten detailed information, and wherein the management system includes: a reservation request means configured to calculate the necessary resources for the generation of the virtual server on the basis of the request received by the request reception means and the use state of the virtualization resources monitored by the monitoring means and request the virtualization resource management node to perform the reservation.

In the management system according to an embodiment of the present invention, the overall management node rewrites the detailed information according to the virtualization resource management scheme and requests the virtualization resource management node to generate the virtual server using the rewritten detailed information. Accordingly, it is unnecessary for the virtual communication-function management node to perform a process according to the virtualization resource management scheme. Thereby, according to the management system according to the embodiment of the present invention, it is possible to implement a virtual server for executing a communication process on virtualization resources without being inefficient even when different virtualization resource management schemes are included.

The overall management node included in the above-described communication system corresponds to the invention having a new configuration. That is, an overall management node according to an embodiment of the present invention is an overall management node in a management system which is included in a communication system configured to include virtualization resources including a physical server in which a virtual server for executing a communication process is generated and which includes a virtual communication-function management node for managing a function of executing the communication process provided in the virtual server, a plurality of virtualization resource management nodes for managing the virtualization resources in different schemes, and the overall management node for managing all the virtualization resources, the overall management node including: a request reception means configured to receive a request related to a function of the communication process accompanied by the generation of the virtual server in the physical server, and a virtual server generation request means configured to input the detailed information for implementing the virtual server on the virtualization resources from the virtual communication-function management node, rewrite the input detailed information according to a virtualization resource management scheme by the virtualization resource management node, and request the virtualization resource management node to generate the virtual server on reserved resources necessary for the generation of the virtual server using the rewritten detailed information.

The present invention can be described as the invention of the management system and the overall management node as described above and can also be described as the invention of the management method as follows. These have only different categories and are substantially the same invention having similar operations and effects.

That is, a management method according to an embodiment of the present invention is a management method which is a method of operating a management system which is included in a communication system configured to include virtualization resources including a physical server in which a virtual server for executing a communication process is generated and which includes a virtual communication-function management node for managing a function of executing the communication process provided in the virtual server, a plurality of virtualization resource management nodes for managing the virtualization resources in different schemes, and an overall management node for managing all the virtualization resources, wherein the virtual communication-function management node includes a retention means configured to retain detailed information for implementing the virtual server on the virtualization resources, and wherein the management method includes: a monitoring step of monitoring, by the virtualization resource management node, a use state of the virtualization resources; a reservation step of performing, by the virtualization resource management node, reservation by receiving a request of the reservation of necessary resources for generation of the virtual server among the virtualization resources; a virtual server generation step of generating, by the virtualization resource management node, the virtual server by receiving a request for generating the virtual server on the necessary resources for the generation of the virtual server reserved in the reservation step; a detailed information output step of outputting, by the virtual communication-function management node, the detailed information retained in the retention means to the overall management node; a request reception step of receiving, by the overall management node, a request related to a function of the communication process accompanied by the generation of the virtual server in the physical server; a virtual server generation request step of inputting, by the overall management node, the detailed information from the virtual communication-function management node, rewriting the input detailed information according to a virtualization resource management scheme by the virtualization resource management node, and requesting the virtualization resource management node to generate the virtual server on the necessary resources reserved in the reservation step using the rewritten detailed information; and a reservation request step of calculating, by the management system, the necessary resources for the generation of the virtual server on the basis of the request received in the request reception step and the use state of the virtualization resources monitored in the monitoring step and requesting the virtualization resource management node to perform the reservation.

Also, a management method according to an embodiment of the present invention is a management method which is a method of operating an overall management node in a management system which is included in a communication system configured to include virtualization resources including a physical server in which a virtual server for executing a communication process is generated and which includes a virtual communication-function management node for managing a function of executing the communication process provided in the virtual server, a plurality of virtualization resource management nodes for managing the virtualization resources in different schemes, and the overall management node for managing all the virtualization resources, the management method including: a request reception step of receiving a request related to a function of the communication process accompanied by the generation of the virtual server in the physical server; and a virtual server generation request step of inputting the detailed information for implementing the virtual server on the virtualization resources from the virtual communication-function management node, rewriting the input detailed information according to a virtualization resource management scheme by the virtualization resource management node, and requesting the virtualization resource management node to generate the virtual server on the reserved resources necessary for the generation of the virtual server among the virtualization resources using the rewritten detailed information.

Also, a management system according to an embodiment of the present invention is a management system which is included in a communication system configured to include virtualization resources including a physical server in which a virtual server for executing a communication process is generated and which includes a virtual communication-function management node for managing a function of executing the communication process provided in the virtual server, one or more virtualization resource management nodes for managing the virtualization resources in one or more schemes, and an overall management node for managing all the virtualization resources, wherein the virtualization resource management node includes: a monitoring means configured to monitor a use state of the virtualization resources; a reservation means configured to perform reservation by receiving a request of the reservation of necessary resources for generation of the virtual server among the virtualization resources; and a virtual server generation means configured to generate the virtual server by receiving a request for generating the virtual server on the necessary resources for the generation of the virtual server reserved by the reservation means, wherein the virtual communication-function management node includes: a retention means configured to retain detailed information for implementing the virtual server on the virtualization resources; and a detailed information output means configured to output the detailed information retained in the retention means to the overall management node, wherein the overall management node includes: a request reception means configured to receive a request related to a function of the communication process accompanied by the generation of the virtual server in the physical server, and a virtual server generation request means configured to input the detailed information from the virtual communication-function management node, rewrite the input detailed information according to a virtualization resource management scheme by the virtualization resource management node, and request the virtualization resource management node to generate the virtual server on the necessary resources reserved by the reservation means using the rewritten detailed information, and wherein the management system includes: a reservation request means configured to calculate the necessary resources for the generation of the virtual server on the basis of the request received by the request reception means and the use state of the virtualization resources monitored by the monitoring means and request the virtualization resource management node to perform the reservation.

Also, an overall management node according to an embodiment of the present invention is an overall management node in a management system which is included in a communication system configured to include virtualization resources including a physical server in which a virtual server for executing a communication process is generated and which includes a virtual communication-function management node for managing a function of executing the communication process provided in the virtual server, one or more virtualization resource management nodes for managing the virtualization resources in one or more schemes, and the overall management node for managing all the virtualization resources, the overall management node including: a request reception means configured to receive a request related to a function of the communication process accompanied by the generation of the virtual server in the physical server, and a virtual server generation request means configured to input the detailed information for implementing the virtual server on the virtualization resources from the virtual communication-function management node, rewrite the input detailed information according to a virtualization resource management scheme by the virtualization resource management node, and request the virtualization resource management node to generate the virtual server on reserved resources necessary for the generation of the virtual server using the rewritten detailed information.

Also, a management method according to an embodiment of the present invention is a management method which is a method of operating a management system which is included in a communication system configured to include virtualization resources including a physical server in which a virtual server for executing a communication process is generated and which includes a virtual communication-function management node for managing a function of executing the communication process provided in the virtual server, one or more virtualization resource management nodes for managing the virtualization resources in one or more schemes, and an overall management node for managing all the virtualization resources, wherein the virtual communication-function management node includes a retention means configured to retain detailed information for implementing the virtual server on the virtualization resources, and wherein the management method includes: a monitoring step of monitoring, by the virtualization resource management node, a use state of the virtualization resources; a reservation step of performing, by the virtualization resource management node, reservation by receiving a request of the reservation of necessary resources for generation of the virtual server among the virtualization resources; a virtual server generation step of generating, by the virtualization resource management node, the virtual server by receiving a request for generating the virtual server on the necessary resources for the generation of the virtual server reserved in the reservation step; a detailed information output step of outputting, by the virtual communication-function management node, the detailed information retained in the retention means to the overall management node; a request reception step of receiving, by the overall management node, a request related to a function of the communication process accompanied by the generation of the virtual server in the physical server; a virtual server generation request step of inputting, by the overall management node, the detailed information from the virtual communication-function management node, rewriting the input detailed information according to a virtualization resource management scheme by the virtualization resource management node, and requesting the virtualization resource management node to generate the virtual server on the necessary resources reserved in the reservation step using the rewritten detailed information; and a reservation request step of calculating, by the management system, the necessary resources for the generation of the virtual server on the basis of the request received in the request reception step and the use state of the virtualization resources monitored in the monitoring step and requesting the virtualization resource management node to perform the reservation.

Also, a management method according to an embodiment of the present invention is a management method which is a method of operating an overall management node in a management system which is included in a communication system configured to include virtualization resources including a physical server in which a virtual server for executing a communication process is generated and which includes a virtual communication-function management node for managing a function of executing the communication process provided in the virtual server, one or more virtualization resource management nodes for managing the virtualization resources in one or more schemes, and the overall management node for managing all the virtualization resources, the management method including: a request reception step of receiving a request related to a function of the communication process accompanied by the generation of the virtual server in the physical server; and a virtual server generation request step of inputting the detailed information for implementing the virtual server on the virtualization resources from the virtual communication-function management node, rewriting the input detailed information according to a virtualization resource management scheme by the virtualization resource management node, and requesting the virtualization resource management node to generate the virtual server on the reserved resources necessary for the generation of the virtual server among the virtualization resources using the rewritten detailed information.

Advantageous Effects of Invention

According to an embodiment of the present invention, a virtual server for executing a communication process can be implemented on virtualization resources without being inefficient even when different virtualization resource management schemes are included because it is unnecessary for a virtual communication-function management node to perform a process according to a virtualization resource management scheme.

BRIEF DESCRIPTION OF DRAWINGS

FIG. 4 is a table storing information to be used in the management system.

FIG. 5 is a table storing information to be used in the management system.

FIG. 6 is a table storing information to be used in the management system.

FIG. 7 is a table storing information to be used in the management system.

FIG. 8 is a table storing information to be used in the management system.

FIG. 9 is a table storing information to be used in the management system.

FIG. 10 is a table storing information to be used in the management system.

FIG. 11 is a table storing information to be used in the management system.

FIG. 12 is a table storing information to be used in the management system.

FIG. 13 is a table storing information to be used in the management system.

FIG. 14 is a table storing information to be used in the management system.

FIG. 23 is a diagram conceptually illustrating instantiation, scale-out, and scale-in.

FIG. 26 is a table storing necessary information for enhancement or reduction in units of internal functional sections.

FIG. 27 is a table illustrating a relationship between a performance increase/decrease unit of a virtualization function and an embodiment.

DESCRIPTION OF EMBODIMENTS

Hereinafter, embodiments of a management system, a virtual communication-function management node, and a management method according to the present invention will be described in detail with reference to the drawings. Also, the same elements are assigned the same reference signs and redundant description thereof will be omitted.

Figure 1:
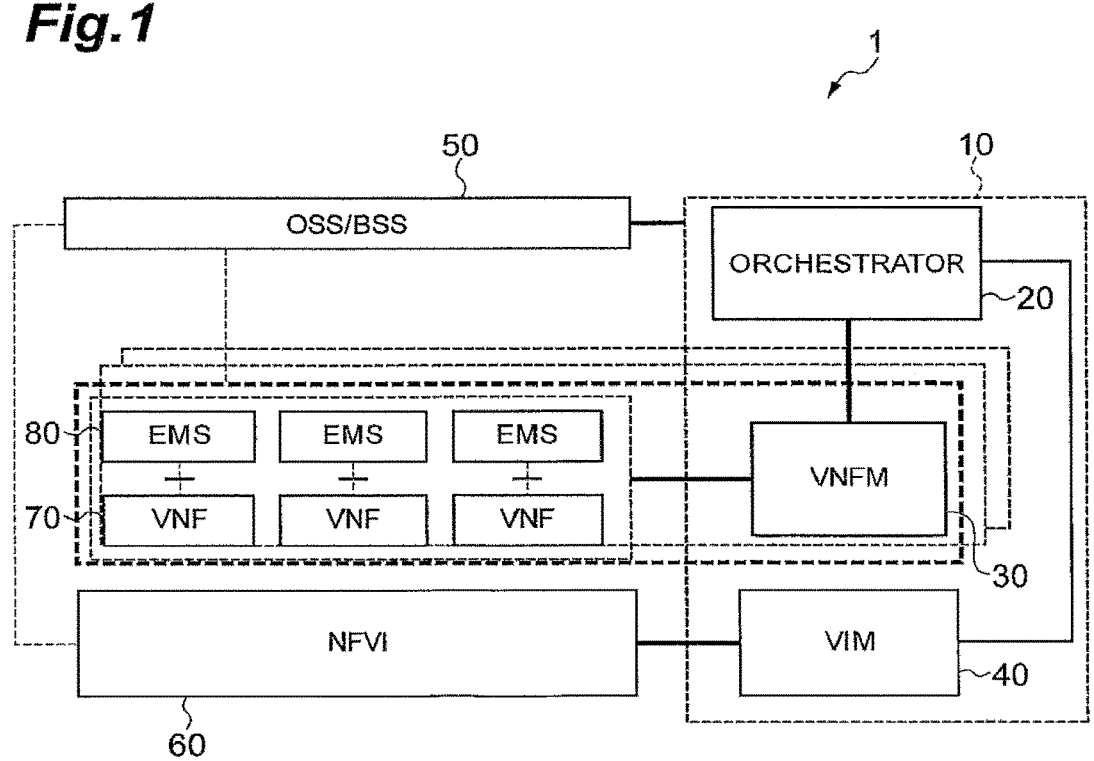
FIG. 1 is a diagram illustrating a configuration of a management system and a mobile communication system including the management system according to an embodiment of the present invention.

FIG. 1 is a diagram illustrating a configuration of a mobile communication system 1 including the management system 10 according to the present embodiment. The mobile communication system 1 is a system for providing a function of mobile communication to a mobile communication terminal (mobile station) (not illustrated). The mobile communication terminal is an apparatus that is used by a user and connects to the mobile communication system (mobile communication network) through wireless communication to perform mobile communication. Specifically, the mobile communication terminal corresponds to a portable telephone or the like. For example, the mobile communication terminal performs communication by establishing a call connection with an opposite node via the mobile communication system 1. The opposite node corresponds to, for example, another mobile communication terminal or a server apparatus for providing various services to the mobile communication terminal, an apparatus (for example, a mobility management entity (MIME), a serving gateway (S-GW), or a PDN gateway (P-GW)) for connecting to another communication network, or the like. The mobile communication terminal can perform mobile communication, for example, when a user of the mobile communication terminal makes a contract with a communication provider of the mobile communication system 1. Also, the mobile communication terminal may be similar to a conventional mobile communication terminal.

As illustrated in FIG. 1, the management system 10 is configured to include the orchestrator 20, a VNFM 30, and a VIM 40. Also, the mobile communication system 1 is configured to include an operations support system/business support system (OSS/BSS) 50, an NFV infrastructure (NFVI) 60, a virtual network function (VNF) 70, and an element management system (EMS) 80. These components constitute a core network of a mobile communication system 1 (mobile communication network). Also, components between which mutual transmission/reception of information is necessary are connected by wire or the like to enable the transmission/reception of the information.

In the mobile communication system 1 according to the present embodiment, a communication function is provided to the mobile communication terminal by virtual server(s) operating in virtual machine(s) implemented on a physical server. That is, the mobile communication system 1 is a virtualized mobile communication network. The communication function is provided to the mobile communication terminal by executing a communication process according to the communication function through the virtual machine(s).

The NFVI 60 includes physical resources, a virtualization layer, and virtualization resources constituting a virtualized environment. The physical resources include calculation resources, storage resources, and transfer resources. The virtualization layer virtualizes the physical resources and provides the virtualized physical resources to the VNF 70 (APL) (for example, a hypervisor). The virtualization resources are virtualized infrastructure resources to be provided to the VNF 70. That is, the NFVI 60 is a virtualization resource configured to include the physical server which is a physical server apparatus for performing a communication process in the mobile communication system 1. The physical server is configured to include a CPU (a core, a processor), a memory, and a storage means such as a hard disk. Generally, a plurality of physical servers constituting the NFVI 60 are arranged at a position of a data center (DC) or the like. In the data center, the arranged physical servers are connected through a network inside the data center and are configured to perform mutual transmission/reception of information. Also, in the mobile communication system 1, a plurality of data centers are provided. The data centers are connected by the network and the physical servers provided in different data centers can perform mutual transmission/reception of the information via their networks.

The VNF 70 is (a function of executing a communication process provided in) virtual server(s) which is a virtual communication processing node to execute the communication process. The VNF 70 is implemented in the NFVI 60. The VNF 70 is implemented, for example, using virtual machine (VM) technology, by allocating the CPU provided in the NFVI 60 for the VNF 70, implementing virtual machine(s) on the allocated CPU, and executing a program on the virtual machine(s). The VNF 70 is generally generated (implemented) according to the communication process to be executed. Also, the VNF 70 may be configured to include a plurality of virtual network function components (VNFCs) which are its components.

The mobile communication system 1 includes one or more (or a plurality of) VNFs 70. The VNF 70 corresponds to a node such as a call session control function (CSCF) or an application server (AS) in IMS. Alternatively, for example, the VNF 70 corresponds to a node such as a serving GPRS support node (SGSN) in a general packet radio service (GPRS) system which is one of the mobile communication systems and a node such as a mobility management entity (MME) or a serving gateway (S-GW) in a Long Term Evolution/Evolved Packet Core (LTE/EPC) system.

The EMS 80 is a node for monitoring and controlling the VNF 70. The EMS 80 is also virtually implemented in the NFVI 60 as in the VNF 70. The EMS 80 is generated in association with the VNF 70 (for example, in a one-to-one relationship with the VNF 70 as illustrated in FIG. 1). The EMS 80 monitors and controls the associated VNF 70. The EMS 80 performs fault, configuration, accounting, performance, and security (FCAPS) management of the VNF 70. The EMS 80 may be virtually implemented as described above or physically implemented to avoid the complexity of management in performing the FCAPS management.

The OSS/BSS 50 is a node which performs service management in the mobile communication system 1 and provides the management system 10 with an instruction related to a communication function in the mobile communication system 1. For example, the OSS/BSS 50 instructs the management system 10 to start up a new communication function (communication service). Also, the OSS/BSS 50 receives information from the EMS 80 and provides the management system 10 or the EMS 80 with an instruction on the basis of the information. Also, the OSS/BSS 50 can be operated by a communication provider related to the mobile communication system 1.

The orchestrator 20 which is a component of the management system 10 is an overall management node (functional entity) for managing the entire NFVI 60 which is a virtualization resource. The orchestrator 20 receives an instruction from (an OSS 51 of) the OSS/BSS 50 and performs a process according to the instruction. The orchestrator 20 performs management of an infrastructure and communication service across all virtualization resources of a mobile communication network. The orchestrator 20 implements a communication service constituted of a plurality of VNFs 70 in a proper place via the VNFM 30 and the VIM 40. For example, life cycle management (specifically, for example, generation, update, scale control, and event collection) of a service, distribution/reservation/allocation management of resources, service/instance management, and policy management (specifically, for example, reservation/allocation, optimum arrangement of resources based on geography/laws, etc.) across the entire mobile communication network.

The VNFM 30, which is a component of the management system 10, is a virtual communication-function management node (functional entity) which manages the VNF 70. A plurality of VNFMs 30 are provided in the mobile communication system 1. In this case, the VNFM 30 to be managed for each VNF 70 may be predetermined. The VNFM 30 performs life cycle management of the VNF 70 (APL). The VNFM 30 performs overall control related to virtualization of the VNF 70. For example, it performs instance generation, update, scale control, termination, and auto-healing of the VNF 70.

The VIM 40, which is a component of the management system 10, is a virtualization resource management node (functional entity) which manages the virtualization resources (infrastructure resources) of units in which the VNF 70 is implemented in the NFVI 60.

Specifically, it performs management of allocation/update/collection of resources, association of virtual resources and physics, and management of lists of hardware resources and SW resources (hypervisor). Generally, the VIM 40 performs management for each data center (station building). The management of the virtualization resources can be performed in a scheme according to the data center. A management scheme of the data center (a mounting scheme of management resources) is of a type such as OPENSTACK or vCenter. Generally, the VIM 40 is provided for each management scheme of the data center. That is, the management system 10 includes a plurality of VIMs 40 which manage the virtualization resources of units in which the VNF 70 is implemented in the NFVI 60 in mutually different schemes. Also, it is unnecessary for units of virtualization resources managed in different management schemes to be units of data centers.

Also, the orchestrator 20, the VNFM 30, and the VIM 40 are implemented by executing a program on a physical server apparatus (however, they are not limited to implementation in virtualization and may be implemented in virtualization separately from the management system). The orchestrator 20, the VNFM 30, and the VIM 40 may be implemented by separate physical server apparatuses or implemented by the same server apparatus. The orchestrator 20, the VNFM 30, and the VIM 40 (or programs for implementing them) may be provided from separate vendors.

Also, the above-described architecture is based on that disclosed in Non-Patent Literature 1. Also, the mobile communication system 1 may include components other than the above-described components to implement a mobile communication function. For example, the mobile communication system 1 may include an apparatus of a base station, an OpenFlow network (including a virtualized element as described above), etc.

Figure 2:
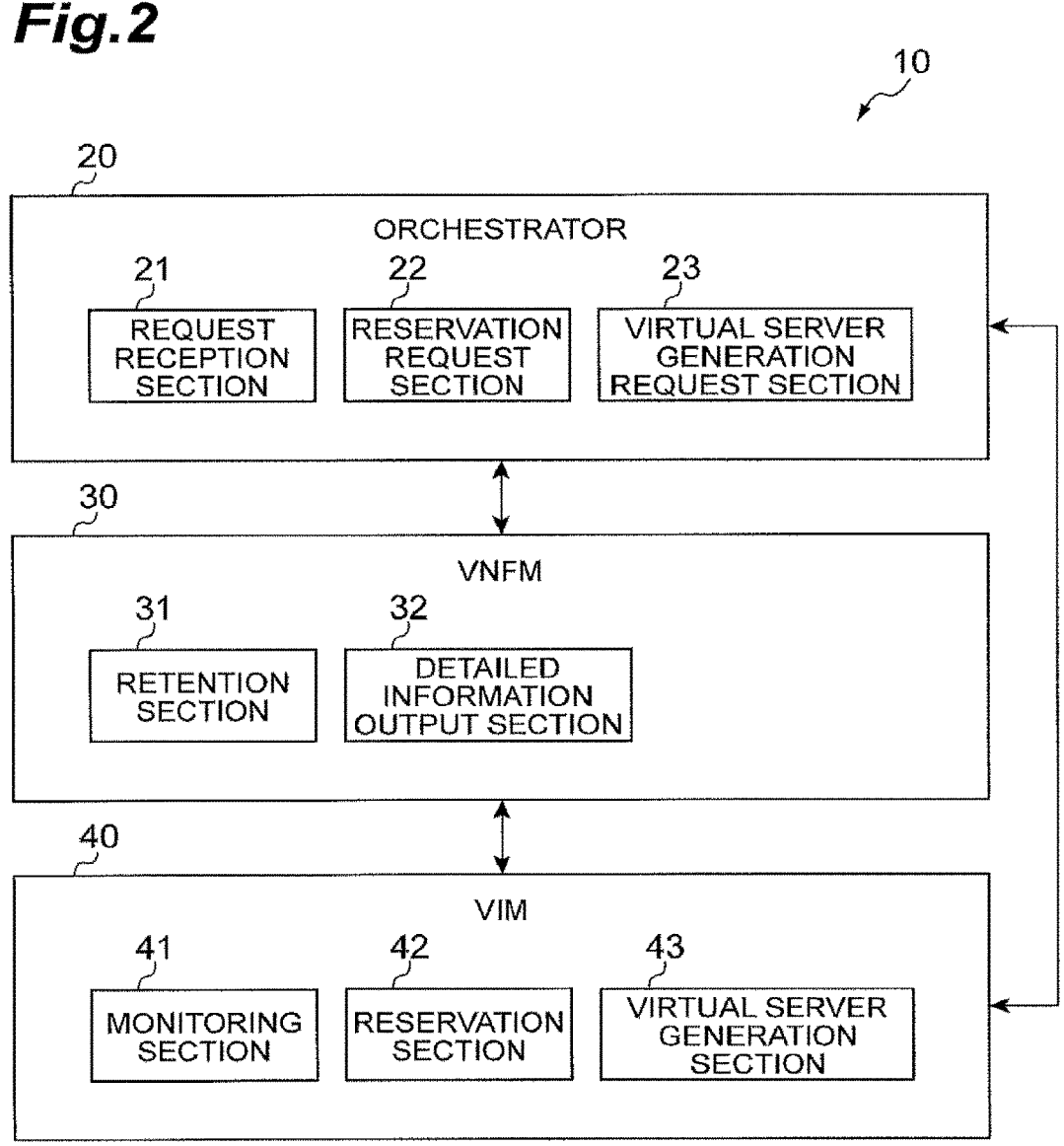
FIG. 2 is a diagram illustrating a functional configuration of the management system according to an embodiment of the present invention.

Next, functions according to the present embodiment provided in the management system 10 will be described. As illustrated in FIG. 2, the orchestrator 20 includes a request reception section 21, a reservation request section 22, and a virtual server generation request section 23. The request reception section 21 is a request reception means which receives a request related to a function of a communication process accompanied by the generation of the VNF 70 in the physical server included in the NFVI 60 from (the OSS 51 of) the OSS/BSS 50.

The reservation request section 22 is a reservation request means which requests the VIM 40 to reserve necessary resources for the generation of the VNF 70 in the NFVI 60 by calculating the necessary resources for the generation of the VNF 70 on the basis of a request received by the request reception section 21, a use state of the NFVI 60 monitored by the VIM 40, information from the VNFM 30, etc.

The virtual server generation request section 23 is a virtual server generation request means for inputting detailed information for implementing the VNF 70 on the NFVI 60 and requesting the VIM 40 to generate the VNF 70 on necessary resources reserved in the NFVI 60 using rewritten detailed information by rewriting the input detailed information according to a virtualization resource management scheme (NFVI 60) by the VIM 40.

As illustrated in FIG. 2, the VNFM 30 includes a retention section 31 and a detailed information output section 32. The retention section 31 is a retention means which retains detailed information for implementing the VNF 70 on the NFVI 60. The detailed information output section 32 is a detailed information output means which outputs the detailed information retained in the retention section 31.

As illustrated in FIG. 2, the VIM 40 includes a monitoring section 41, a reservation section 42, and a virtual server generation section 43. The monitoring section 41 is a monitoring means which monitors the use state of the NFVI 60. The reservation section 42 is a reservation means which performs reservation by receiving a request of the reservation of the necessary resources for the generation of the VNF 70 in the NFVI 60 from the orchestrator 20. The virtual server generation section 43 is a virtual server generation means which generates the VNF 70 by receiving the request for generating the VNF 70 on the necessary resources for the generation of the VNF 70 reserved by the reservation section 42 from the orchestrator 20.

The above function is a function related to the present embodiment provided in the management system 10. Also, in the description of a process by the management system 10 using a sequence diagram, functions of the orchestrator 20, the VNFM 30, and the VIM 40 according to the present embodiment will be described in more detail. Also, functions which are not included in the above-described functional sections are provided in the orchestrator 20, the VNFM 30, and the VIM 40, but description of these functions is also included in the description of the process by the management system 10 using the sequence diagram.

Figure 3:
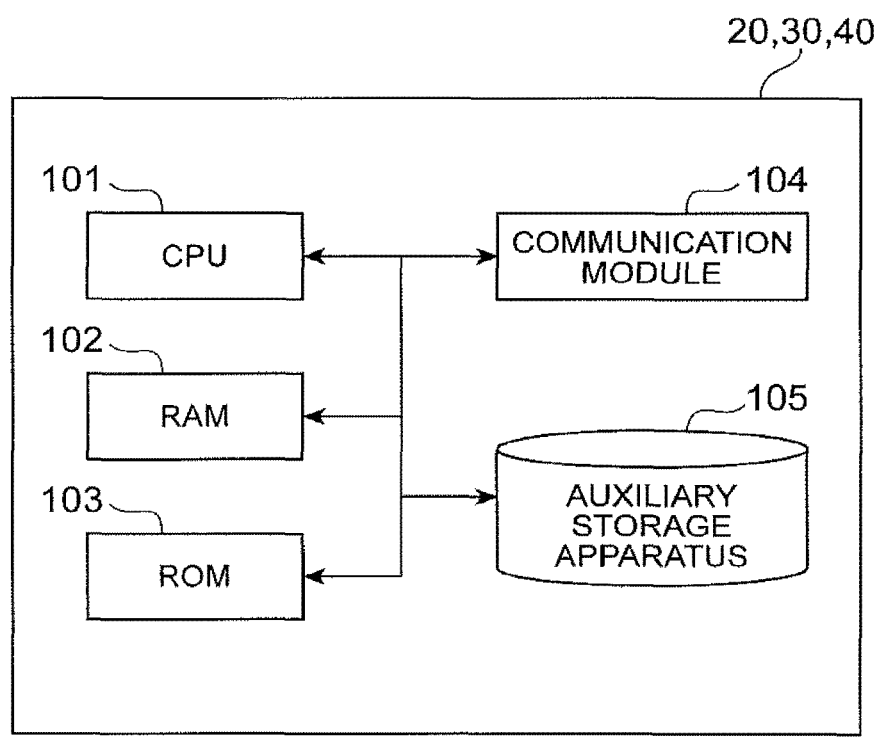
FIG. 3 is a diagram illustrating a hardware configuration of a node included in the management system according to an embodiment of the present invention.

FIG. 3 illustrates a hardware configuration of a server apparatus constituting the orchestrator 20, the VNFM 30, and the VIM 40 included in the management system 10 according to the present embodiment. As illustrated in FIG. 3, the server apparatus is configured to include a computer provided with hardware such as a CPU 101, a random access memory (RAM) 102 and a read only memory (ROM) 103 which are main storage apparatuses, a communication module 104 for performing communication, and an auxiliary storage apparatus 105 such as a hard disk. These components are operated by a program, etc., so that the functions of the orchestrator 20, the VNFM 30, and the VIM 40 described above and to be described below are exhibited. Also, the orchestrator 20, the VNFM 30, and the VIM 40 may be constituted of a computer system including a plurality of server apparatuses. Also, a node other than the above-described nodes included in the mobile communication system 1 may also be implemented by a server apparatus having the above-described hardware configuration. The above configuration is a configuration of the management system 10 according to the present embodiment.

Figure 21:
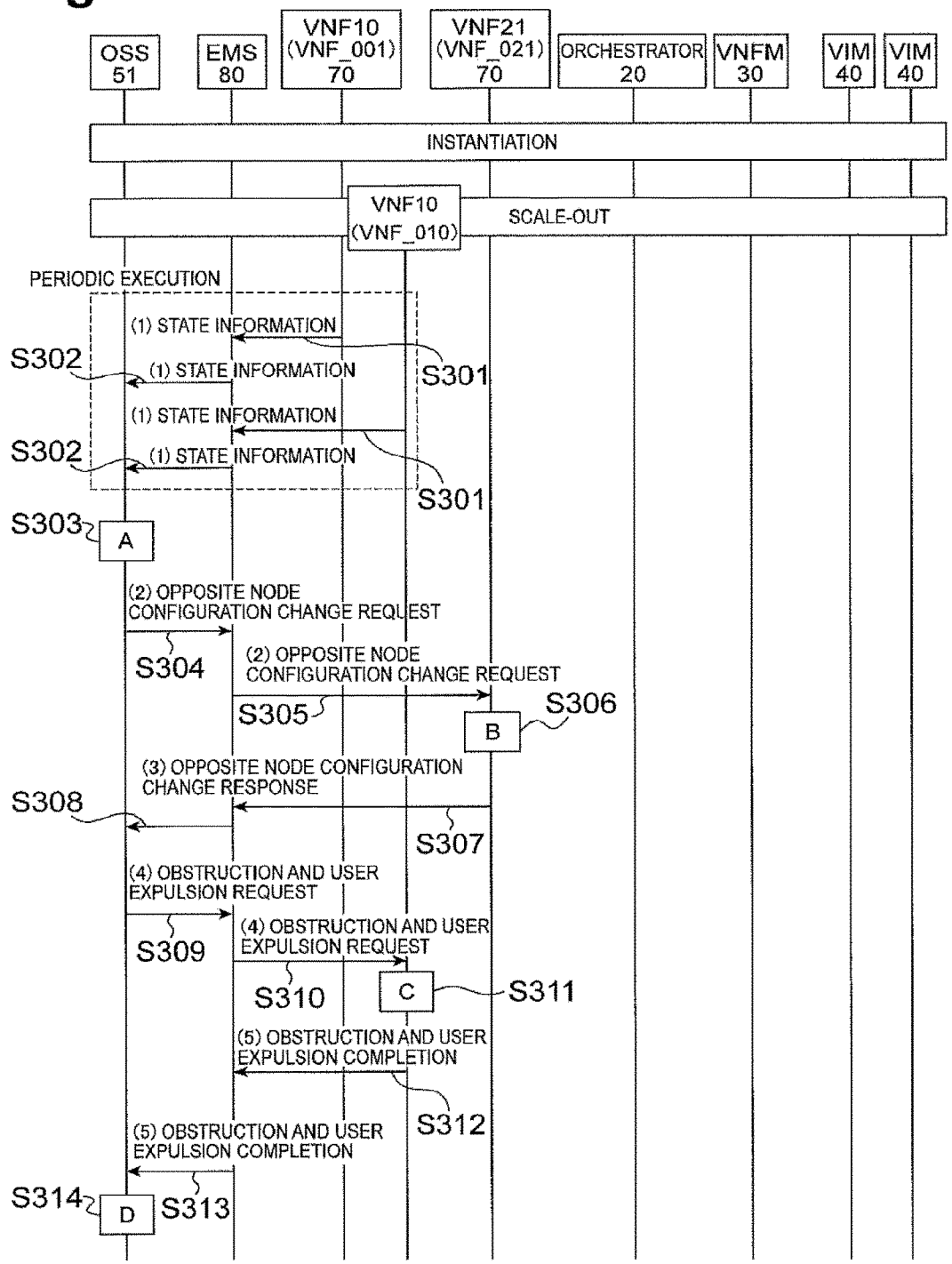
FIG. 21 is a sequence diagram illustrating a process management method) to be executed during scale-in in the management system according to an embodiment of the present invention.
Figure 22:
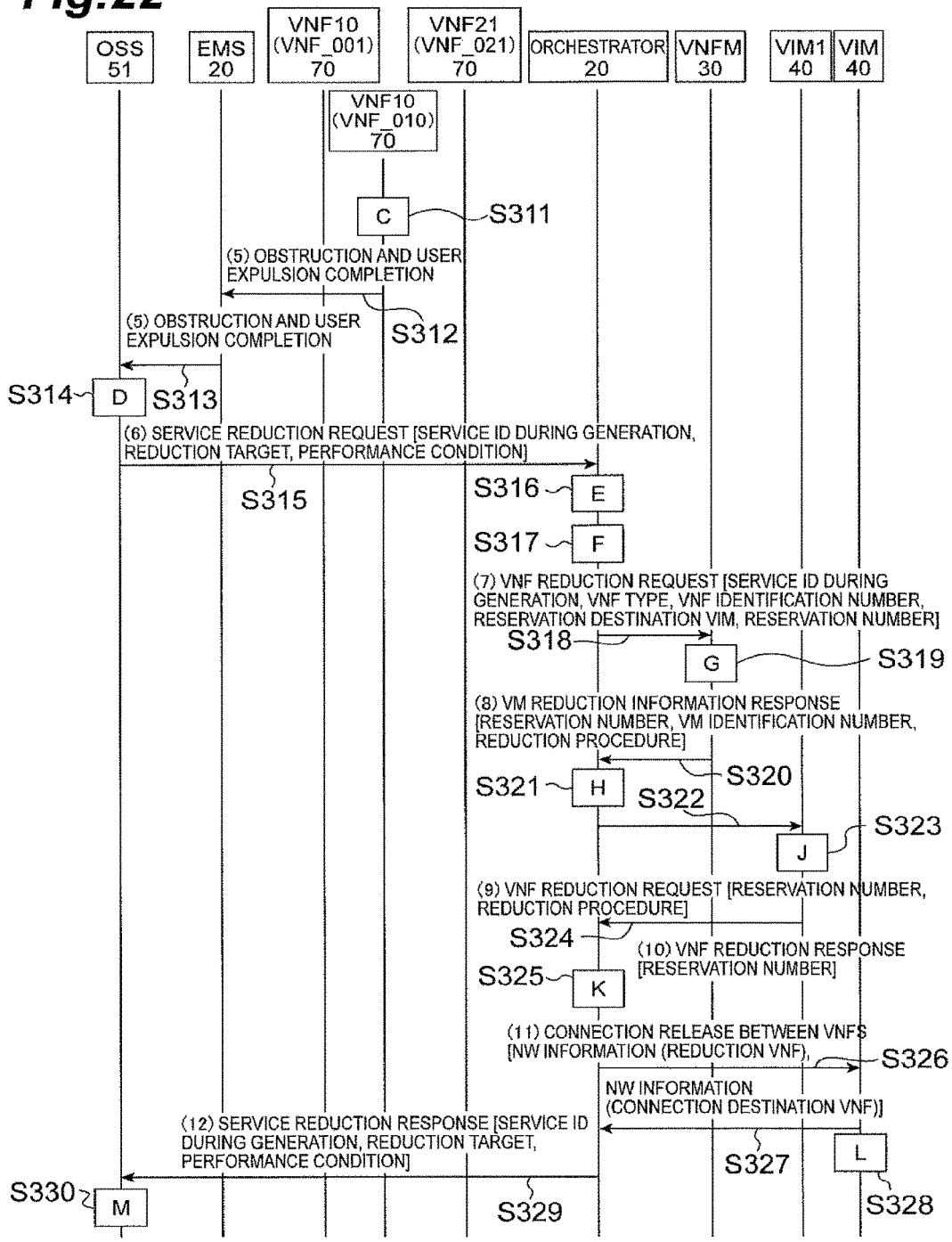
FIG. 22 is a sequence diagram illustrating a process (management method) to be executed during scale-in in the management system according to an embodiment of the present invention.
Figure 23:
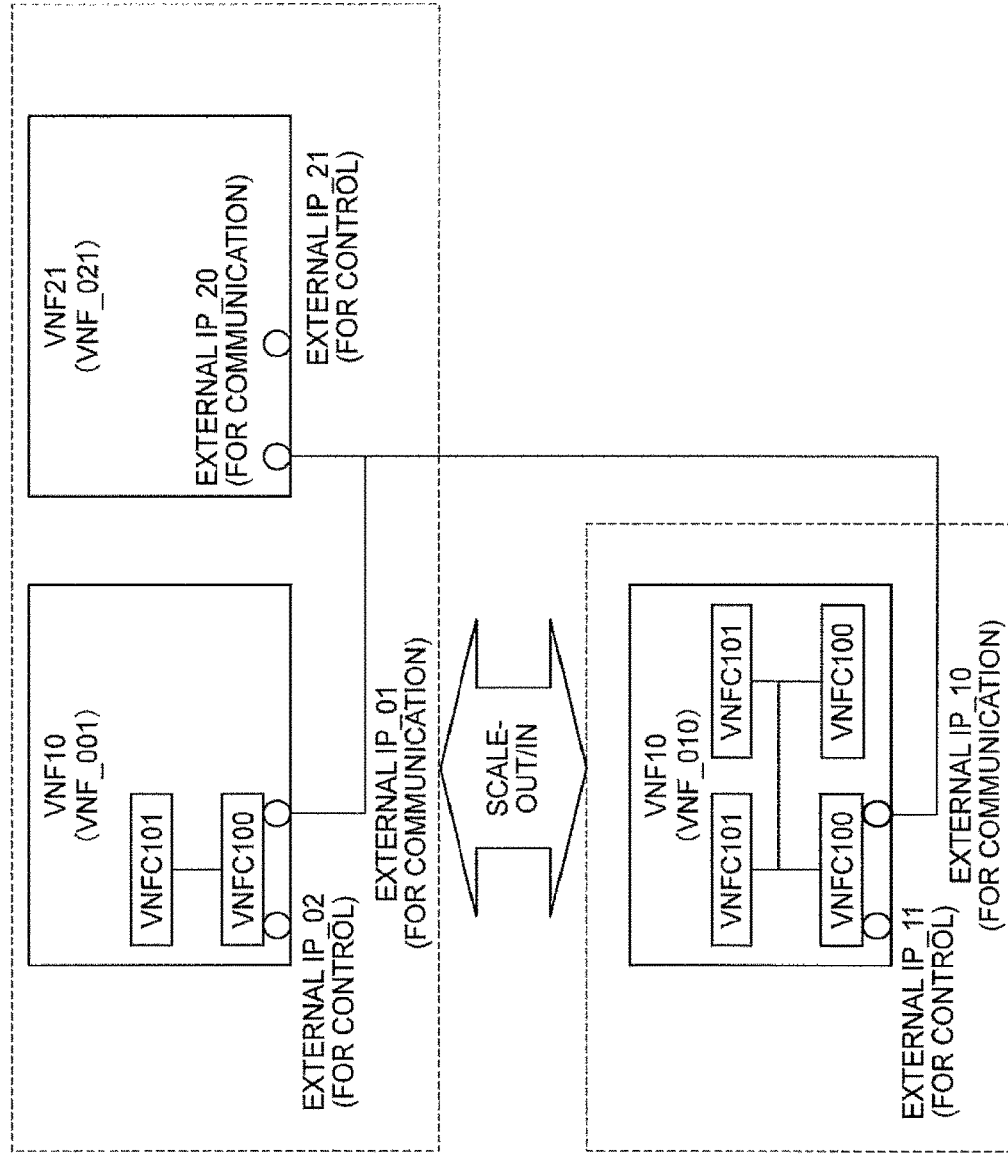

Next, a management method which is a process to be executed by the management system 10 according to the present embodiment will be described using tables of FIGS. 4 to 14 and sequence diagrams of FIGS. 15 to 22. Hereinafter, processes when (1) instantiation, (2) auto-healing, (3) scale-out, and (4) scale-in are performed in the mobile communication system 1 will be described for each of the above-described cases. Also, FIG. 23 illustrates overviews of the instantiation, the scale-out, and the scale-in.

First, a process when (1) instantiation is performed will be described using the sequence diagrams of FIGS. 15 and 16.

Figure 15:
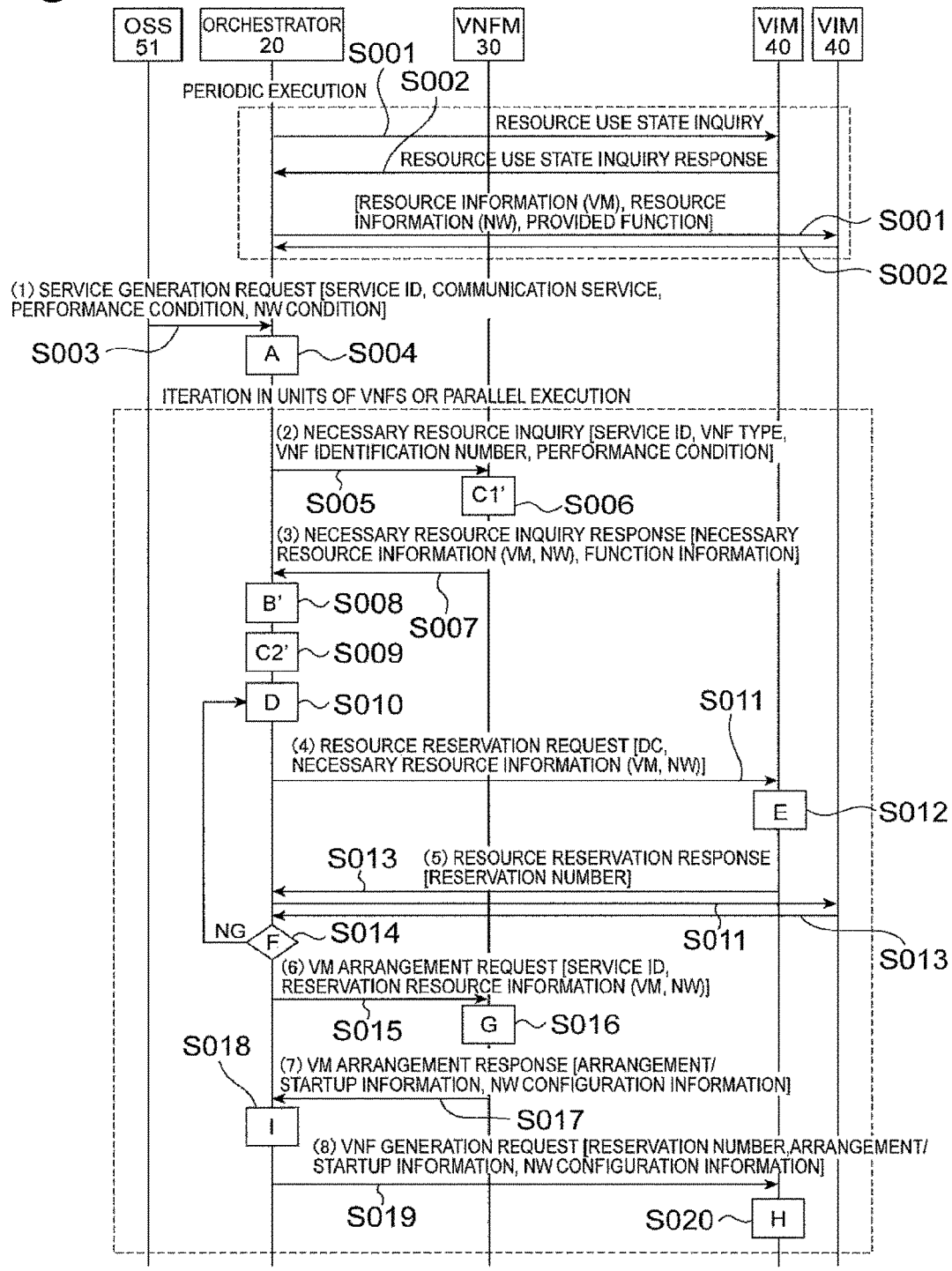
FIG. 15 is a sequence diagram illustrating a process (management method) to be executed during instantiation in the management system according to an embodiment of the present invention.
Figure 16:
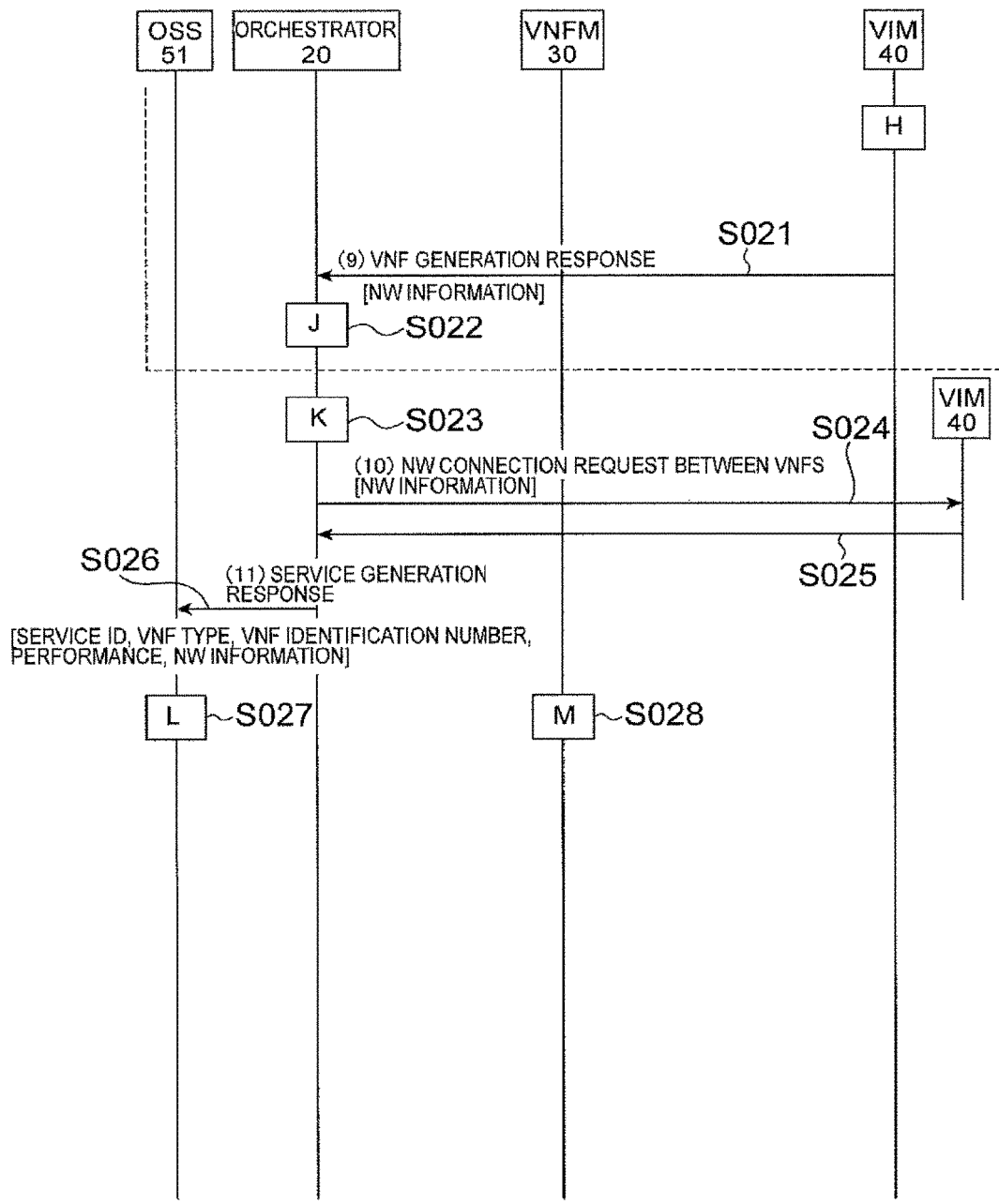
FIG. 16 is a sequence diagram illustrating a process (management method) to be executed during instantiation in the management system according to an embodiment of the present invention.

Also, the sequence diagram illustrated in FIG. 16 is a continuation of the sequence diagram of FIG. 15 (in a time-series manner). The instantiation is the generation of a new VNF 70 according to the communication service to provide a new communication service (communication function) in the mobile communication system 1. According to the instantiation, the new communication service is provided in the mobile communication system 1.

First, in the orchestrator 20, a resource use state inquiry is performed for each VIM 40 (S001). In the VIM 40, the monitoring section 41 receives the resource use state inquiry. The monitoring section 41 monitors the resource use state of the NFVI 60 serving as a management target of the VIM 40. Information indicating the resource use state obtained as a monitoring result is transmitted from the monitoring section 41 to the orchestrator 20 as a resource use state inquiry response (S002, monitoring step). The orchestrator 20 receives the information. The processes of S001 and S002 are periodically performed for each VIM 40.

This information is information of each data center (DC) as shown in Table T1 of FIG. 4(a) and is obtained by associating resource information of the virtual machine(s) and the network (NW) and information indicating provided functions. That is, this information is state information of resources of the entire mobile communication system 1 (mobile communication network). The information is constantly retained in a network total resource information database provided in the orchestrator 20.

In Table T1 of FIG. 4(a), an available bandwidth is an available bandwidth of a communication path (of an exit of the data center) between the data center and the outside of the data center. An available external address is an address assignable to the VNF 70 and is necessary for the VNF 70 to communicate with another VNF 70 or an element other than the VNF 70. The provided function is a function related to communication capable of being provided by dedicated hardware or software in the data center. Specifically, there is a high-speed packet processing function (for example, DPDK of Intel Corporation), a function (for example, SR-IOV) of bypass technology of a virtualization layer, or the like.

Next, a request (signal (1)) of service generation related to a communication service is transmitted from (the OSS 51 of) the OSS/BSS 50 to the orchestrator 20. The communication service is, for example, voice communication and communication in which an image or a moving image (rich media) is transmitted and received (a communication service differs according to each type of data to be transmitted). This request is a request related to a function of the communication process accompanied by the generation of the VNF 70 in the physical server included in the NFVI 60. In the orchestrator 20, the request reception section 21 receives the signal (S003, request reception step).

The signal includes information indicating a service ID serving as a number for uniquely identifying a generated service, a communication service to be generated, a performance condition, and network information. Specifically, "communication service 1" in the communication service, "100" in the performance condition, and "DC 1 connection and bandwidth of 5 Gbps or more" indicating <DC connected to DC 1 in a bandwidth of 5 Gbps or more> in the NW (network) condition are included (set) in the signal.

The performance condition is a normalized index value for indicating capability in control (generation, enhancement, reduction, or the like) for the VNF 70 and a service configured by the VNF 70. The performance condition is pre-negotiated between the OSS 51 and the VNFM 30.

Next, the VNF 70 (virtualized function) and the VNFM 20 (management function) constituting a communication service specified by information included in the signal are specified from operation data pre-registered in the orchestrator 20. Specifically, "VNF 10" and "VNF 21" serving as the VNF 70 constituting "communication service 1" are derived from Table T2 of FIG. 5(a) which is the operation data and the fact that the VNFM 30 of "VNF 10" is "VNFM 1" and the VNFM 30 of "VNF 21" is "VNFM 2" is derived from Table T3 of FIG. 5(b) which is the operation data (A, S004).

The subsequent processes of S005 to S022 are executed sequentially or in parallel in units of VNFs 70. Here, the generation of "VNF 10" is shown.

Next, the orchestrator 20 dispatches a VNF identification number "VNF_001" as a number for uniquely identifying the generated VNF 70 to obtain necessary resource information of the specified "VNF 10," sets the performance condition "100" and the service ID received in the signal (1) and "VNF 10" derived from "Service 1" in the VNF type, and sends an inquiry to "VNFM1" which is its management function through a signal (2) (S005).

In "VNFM 1," the inquiry is received. In "VNFM 1," detailed information of "VNF 10" set in the VNF type of the received signal (2) is read from the VNF detailed information database previously retained (registered) in the retention section 31 of the "VNFM L" In the detailed information, a combination of resource information (VM), resource information (NW), and function information according to a VNF internal structure and a performance condition of Table T9 of FIG. 6 is registered. A model number of Table T9 of FIG. 6 is an identifier of each combination. An image file of the resource information (VM) retains information for configuring a VM as a file and is used when the VNF 70 starts up. The image file is pre-stored in any place within a communication network from which the image file can be read by the VIM 40. The VNF 70 is constituted of one or more internal functional sections and resources for generating the VNF 70 are secured by the VIM 40 for each internal functional section. Arrangement/startup information includes correspondence relationships among the resources of each internal functional section secured by the VIM 40 and the image file, setting information for starting up the VNF 70 using the image file, a startup procedure for each internal functional section, and a reduction procedure for each internal functional section when the VNF 70 is deleted. NW configuration information of the resource information (NW) is information indicating an NW connection type of the internal functional section of the VNF 70.

In "VNFM 1," resource information (VM), resource information (NW), and the function information necessary for the performance condition "100" of the VNF type "VNF 10" received in the signal (2) are extracted from the read detailed information (Table T9 of FIG. 6) and Table T20 of FIG. 10(c) is obtained as a combination of internal functional sections (C1', S006). In detail, it can be seen that "VNF 10" is constituted of the internal functional sections "VNFC 100" and "VNFC 101" from the read Table T9 of FIG. 6. Further, in the case of the performance condition "100," it can be seen that the internal functional section "VNFC 100" can be generated by virtual resources (VM and NW) of the model number "001" using the CPU performance "High" or the model number "002" using the CPU performance "Low" and the internal functional section "VNFC 101" can be generated by virtual resources (VM and NW) of the model number "005" using the CPU performance "High" or the model number "006" using the CPU performance "Low" Thereby, combinations of necessary virtual resources for generating the VNF 70 having the performance condition "100" of the VNF type "VNF 10" indicated by the signal (2) are of 4 types in which "VNFC 100" and "VNFC 101" are constituted of only the CPU performance "High," the CPU performance "High" and "Low," and only the CPU performance "Low." Here, the CPU performance indicates a classification related to calculation performance based on an operation frequency of the CPU, the number of physical cores, fast calculation technology, or the like. In "VNFM 1," the obtained resource information of Table T20 is set in a signal (3) and is returned as a response of the signal (2) to the orchestrator 20 (S007). In "VNFM 1," Table T9 of a service ID, a VNF type, a VNF identification number, and detailed information of the signal (2) is stored.

In the orchestrator 20, the signal (3) is received. The orchestrator 20 receiving the signal (3) selects a data center in which "VNF 10" can be arranged using the operation condition of Table T4 of FIG. 5(*c*), the NW condition input according to the signal (1), and the connection configuration of the data center of Table T5 of FIG. 5(*e*) to generate "VNF 10" specified in A (S004). Candidates "DC 2," "DC 3," "DC 4," and "DC 5" can be obtained as the data center in which "VNF 10" can be arranged from Table T4 of FIG. 5(*c*) pre-registered in the orchestrator 20. Next, it is determined that "DC 5" does not satisfy the condition from "DC 1 connection and bandwidth of 5 Gbps or more" of the input NW condition and connection information indicating that the data centers connected to "DC 1" capable of being obtained from Table T5 of FIG. 5(*e*) pre-registered in the orchestrator 20 are "DC 2," "DC 3," and "DC 4," and the candidate data centers become "DC 2," "DC 3," and "DC 4."

Next, the orchestrator 20 reads resource information of the selected "DC 2," "DC 3," and "DC 4" from Table T1 of FIG. 4(*a*) of the network total resource information database accumulated through periodic collection. The read resource information is shown in Table T8 of FIG. 4(*b*) (B', S008).

An available data center is extracted by comparing read resource information of Table T8 of FIG. 4(*b*) with necessary resource information of Table T20 of FIG. 10(*c*) received in the signal (3). Specifically, it is determined that "VNF 10" requires "function 1" and "function 2" from Table T20 and data centers capable of providing "function 1" and "function 2" are "DC 2" and "DC 3" from Table T8 of FIG. 4(*b*).

Next, necessary resource information is derived to generate the VNF 70 in resources provided by an available data center. Specifically, from Table T8 of FIG. 4(*b*), it can be determined that "DC 2" can provide high and low CPU performance and "DC 3" can provide low CPU performance. This is collated with the CPU performance in the combination of Table T20 (it is determined that the necessary resource information for the generation of the VNF 70 is available in the data center), it can be determined that combinations 1 to 4 in "DC 2" and combination 1 in "DC 3" can be taken as combinations of resource information capable of being obtained by "DC 2" and "DC 3," and Table T10 of FIG. 7(*a*) can be obtained (C2, S009).

Next, in the orchestrator 20, the reservation request section 22 can obtain Table T13 of FIG. 7(*b*) by assigning priority to the combination table (Table T10 of FIG. 7(*a*)) of the resource information and the data centers on the basis of a priority index of Table T12 of FIG. 5(*f*) pre-registered in the orchestrator 20 (D, S010). A specific procedure will be described. First priority from Table T12 of FIG. 5(*f*) becomes a bandwidth between DCs. It can be seen that DCs serving as the candidates from Table T10 of FIG. 7(*a*) are "DC 2" and "DC 3" and an NW bandwidth between "DC 1" and "DC 2" is greater than an NW bandwidth between "DC 1" and "DC 3" from Table T5 of FIG. 5(*e*), and "DC 2" has high priority. Next, second priority from Table T12 of FIG. 5(*f*) becomes the CPU performance. From Table T10 of FIG. 7(*a*), it can be seen that the priority of combination 2 of only the CPU performance "High" among combinations of "DC 2" is highest and the priority of combination 1 of only the CPU performance "Low" is lowest. For combinations 3 and 4 of the CPU performance "High" and "Low," a small VM storage region of third priority is used. From Table T10 of FIG. 7(*a*), it can be seen that the number of VMs of 300 GB in the VM storage region is (1+2) in combination 3, the number of VMs of 300 GB is 2 and the number of VMs of 500 GB is 1 in combination 4, and the priority of combination 3 having a small capacity of the VM storage region is high. Thereby, Table T13 of FIG. 7(*b*) in which the priority is assigned to the combination of necessary resources can be obtained.

Next, reservation of the VIM 40 for managing the data center is performed in the order of combination of high priority. The reservation request section 22 sets the necessary resources of combination 2 of "DC 2" having highest priority in Table T13 of FIG. 7(*b*) and "DC 2" of the target and a resource reservation request is transmitted to "VIM 1" which is a management function of "DC 2" read from Table T6 of FIG. 5(*d*) (signal (4), S011, reservation request step). In the case of a combination of priority 1 of Table T13 of FIG. 7(*b*), information of Table T14 of FIG. 8(*a*) becomes necessary resource information (VM and NW) (is set as necessary resource information). When the resource reservation fails, a reservation request of the combination of the next highest priority is generated (F, return from the process S014).

In "VIM 1," the signal (4) is received. In "VIM 1" receiving the signal (4), the reservation section 42 confirms whether necessary resources shown in Table T14 of FIG. 8(*a*) requested in the signal (4) can be secured in "DC 2" set in the signal (4) on the basis of an inside management area resource information database and a reservation number for which the resources are reserved is dispatched (E, S012, reservation step). In "VIM 1," the reserved "DC 2" and reserved resource information (Table T14) are stored along with the reservation number. In "VIM 1," a reservation number serving as a response when the resources can be secured and an error serving as a response when the resources cannot be secured are provided to the orchestrator 20 (signal (5), S013).

In the orchestrator 20, the signal (5) from "VIM 1" is received. In the orchestrator 20 in which the signal (5) from "VIM 1" is received, a resource reservation result is confirmed (F, S014). When the reservation of the resources is impossible (F, NG of S014), reservation of a combination of the next highest priority is performed by returning to the process of D (S010) again.

When the reservation succeeds, the orchestrator 20 sets the service ID dispatched in the process of S005 and resource information of Table T14 of FIG. 8(*a*) serving as reservation resource information (VM and NW) and requests "VNFM 1" to provide the arrangement/startup information and the NW configuration information necessary for the generation of "VNF 10" (signal (6), S015). Also, in the orchestrator 20, the service ID, the VNF type, the VNF identification number, the reservation number, the reserved "VIM 1," and the reserved "DC 2" are stored.

In "VNFM 1," the detailed information output section 32 receives the signal (6). Next, the detailed information output section 32 reads Table T9 of FIG. 6 of the detailed information stored in C1' (S006) from the service ID received in the signal (6) and determines the arrangement/startup information and the NW (network) configuration information corresponding to the model numbers "001" and "005" of Table T14 of FIG. 8(a) of the reserved resource information (VM and NW) received in the signal (6). Next, the detailed information output section 32 dispatches and assigns a VM identification number to the generated virtual machine (VM) (G, S016).

Next, in "VNFM 1," the detailed information output section 32 sends a response of Table T15 of FIG. 8(b) associated with the reserved resource information as the signal (7) to the orchestrator 20 (S017, detailed information output step). In "VNFM 1," the service ID, the VNF type, and the VNF identifier stored in C1' are associated with a VM identification number and an internal functional section and Table T26 of FIG. 9(c) is stored.

In the orchestrator 20, the virtual server generation request section 23 receives the signal (7). Next, the virtual server generation request section 23 reads "VIM 1," "DC 2," and reservation number 1 stored in S015. Next, the virtual server generation request section 23 confirms a type of "VIM 1" from Table T6 of FIG. 5(d) and changes a format of the arrangement/startup information and the NW configuration information of Table T15 of FIG. 8(b) received in the signal (7) according to the VIM type (rewrites detailed information according to a management scheme of the VIM 40) (I, S018, virtual server generation request step). Also, this rewriting can be performed according to the conventional technology.

Next, the virtual server generation request section 23 requests "VIM 1" to generate "VNF 10" through a signal (8) in which the arrangement/startup information and the NW configuration information for which the format is changed for "VIM 1" and the read reservation number 1 is set (S109, virtual server generation request step). Information set as the arrangement/startup information and the NW configuration information becomes Table T15 of FIG. 8(b).

In "VIM 1," the virtual server generation section 43 receives the signal (8). Next, the virtual server generation section 43 specifies resources of "DC 2" secured in the process of E (S012) as resources for starting up the VNF 70 from a reservation number received in the signal (8). Next, the virtual server generation section 43 reads image files of VM and VNF in "DC 2" on the basis of the arrangement/startup information and the NW configuration information of Table T15 received in the signal (8) and generates/starts up VM and the VNF 70.

In "VIM 1," the virtual server generation section 43 assigns "external IP address 01" and "external IP address 02" as a number of external addresses designated in the signal (8) to VM from a pre-allocated external IP address band. In "VIM 1," information of Table T25 of FIG. 9(a) is stored by associating the reservation number, the data center, the VM identification number of "VNFM 1," the allocated resource information, and the physical apparatus (HW) (H, S020, virtual server generation step).

Next, the virtual server generation section 43 provides the orchestrator 20 with a response of Table T17 of FIG. 9(b) in which a correspondence relation of "external IP address 01" and "external IP address 02" allocated during VM generation and VM is set as the NW (network) information in a signal (9) (S021 of FIG. 16).

In the orchestrator 20, the signal (9) is received. In the orchestrator 20 receiving the signal (9), the VM identification number and the NW information set in the signal (9) are added to the information of the VNF 70 stored in the process of S015 and stored. Content of the information becomes Table T19 of FIG. 9(d) (J, S022).

For "VNF 21," procedures of B to J (processes of S005 to S022) are similarly executed. In the orchestrator 20, Table T28 of FIG. 9(e) in which a result of generating "VNF 21" is reflected can be obtained (K, S023).

The orchestrator 20 confirming that the generation of "VNF 10" and "VNF 21" determined to be generation targets in A (S004) is completed specifies "VIM-NW" which is the VIM 40 for managing a network between the data centers by Table T6 of FIG. 5(d) and a notification of IP addresses of NW information of "VNF 10" and "VNF 21" from Table T28 of FIG. 9(e) is provided to request a connection between VNFs 70 (signal (10), S024). In "VIM-NW," a process according to the request is performed and its response is transmitted to the orchestrator 20 (S025).

When a connection between VNFs 70 is completed in the orchestrator 20, the OSS 51 is notified of performance, VNF types, VNF identification numbers, and NW information of "VNF 10" and "VNF 21" in a signal (11) (S026).

In the OSS 51, the signal (11) is received and request content of the signal (1) and a result of the signal (11) are associated and retained as Table I29 of FIG. 10(a) (L, S027).

In "VNFM 2" which is the VNFM 30 of "VNF 21" generated subsequently to "VNF 10," information of Table T30 of FIG. 9(f) is retained (M, S028).

After the completion of communication service generation, the orchestrator 20, the VNFM 30 of "VNF 10," the VNFM 30 of "VNF 21," and the VIM 40 retain information of Table T28 of FIG. 9(e), Table T26 of FIG. 9(c), Table T30 of FIG. 9(f), and Table T25 of FIG. 9(a), respectively, and use the retained information in control such as enhancement, reduction, and termination of the service or a maintenance operation for malfunction, congestion, construction, etc.

For example, the VIM 40 specifies a VM related to the hardware when a hardware malfunction occurs using information of Table T25 of FIG. 9(a) and the VNFM 30, which is its management function section, or the orchestrator 20 is notified of the specified VM and auto-healing or maintenance personnel can cope with the malfunction. Also, even for an increase/decrease or termination operation on a VM, resources having an influence are specified and used to manage resource information. Likewise, the orchestrator 20 and the VNFM 30 also use the correspondence relationship between Table T28 of FIG. 9(e) and Table T30 of FIG. 9(f) to execute an operation such as enhancement, reduction, or termination on a communication service or an internal function.

Also, correspondence relationship information can also be aggregated in an operating system (OSS 51) of the entire communication network and used to monitor/operate the entire communication network. The above process is a process when (1) instantiation is performed.

Figure 17:
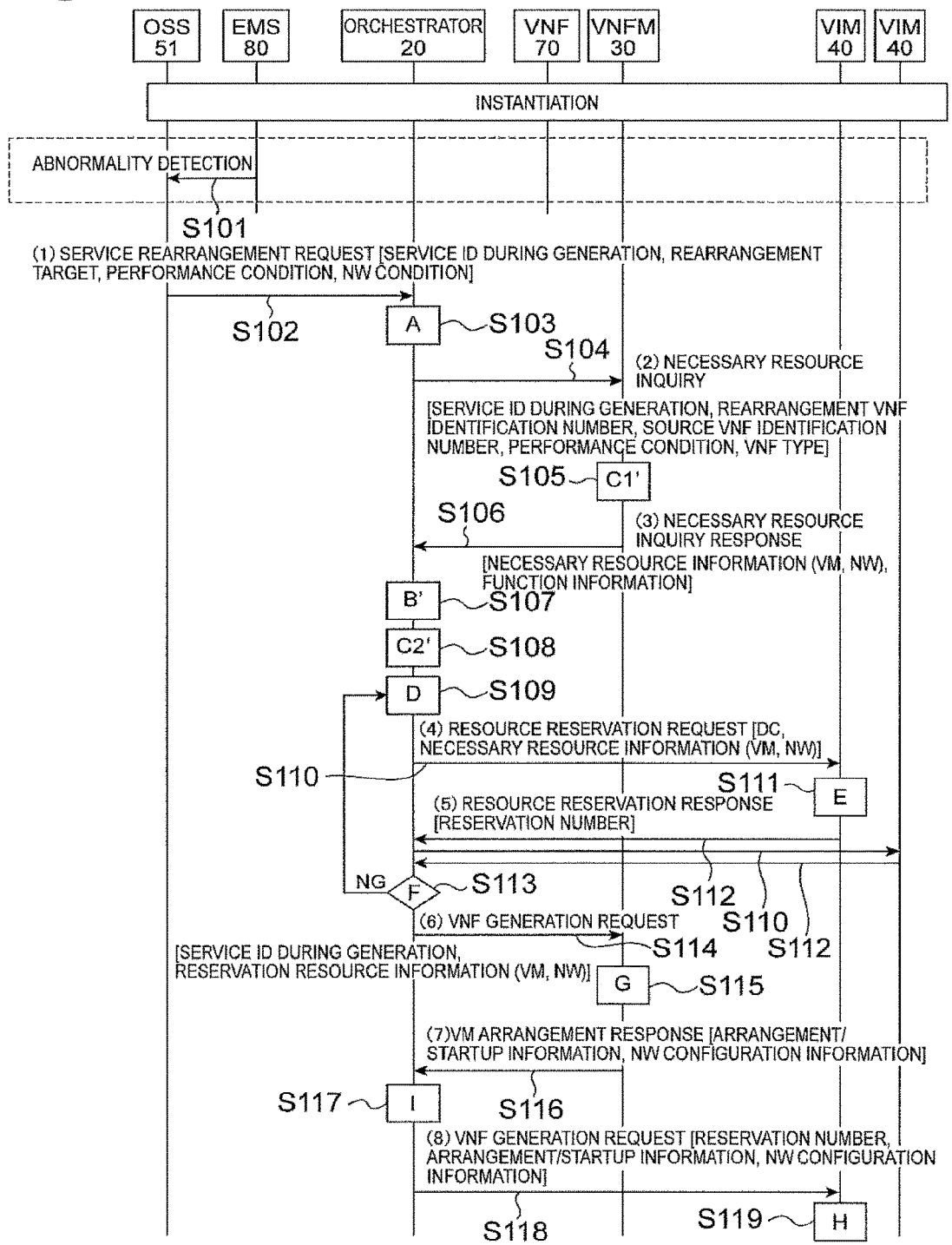
FIG. 17 is a sequence diagram illustrating a process (management method) to be executed during auto-healing in the management system according to an embodiment of the present invention.
Figure 18:
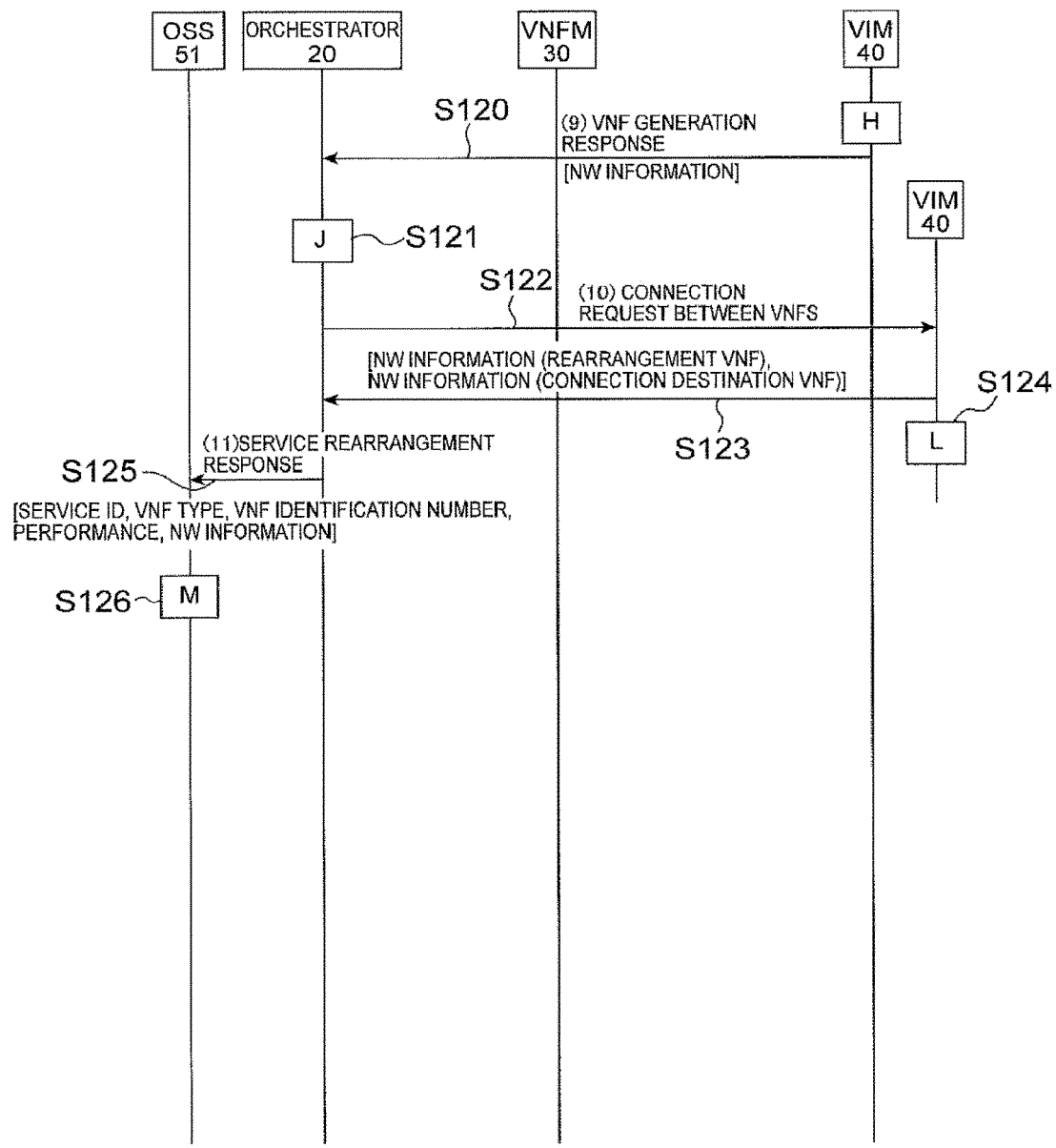
FIG. 18 is a sequence diagram illustrating a process (management method) to be executed during auto-healing in the management system according to an embodiment of the present invention.

Next, a process when (2) auto-healing is performed will be described using sequence diagrams of FIGS. 17 and 18. Also, the sequence diagram illustrated in FIG. 18 is a continuation of the sequence diagram of FIG. 17 (in a time-series manner). In the auto-healing, the VNF 70 to operate normally is automatically generated when the VNF 70 does not operate normally due to abnormality of hardware or software. Through the auto-healing, a communication function is automatically recovered in the mobile communication system 1.

The OSS 51 operates while monitoring a state of the VNF 70 generated in an instantiation process (procedure) through the EMS 80 which is an operation management system as in the conventional system. The EMS 80 detecting abnormality (for example, non-response) of the VNF 70 during the operation notifies the OSS 51 of the abnormality (S101) and the OSS 51 can re-arrange the VNF 70. An example in which the OSS 51 receiving information from the EMS 80 detecting an abnormal operation (for example, non-response) of "VNF 10" between "VNF 10" and "VNF 21" generated in the instantiation process determines a rearrangement in which "VNF 10" is replaced and requests the orchestrator 20 to generate a replacement VNF 70 will be described.

A signal (1) in which a service ID used when a rearrangement source VNF 70 is generated, a VNF identification number "VNF_001" for identifying a rearrangement target, "100" which is a performance condition indicating performance to be rearranged (for example, a performance index value equivalent to that of a current state), and a "separate DC" indicating the installation for a DC separate from the current DC as the NW condition are set is transmitted from the OSS 51 to the orchestrator 20 (S102).

In the orchestrator 20, the request reception section 21 receives a service rearrangement request (S102, request reception step). In the orchestrator 20 receiving the service rearrangement request, the VNF type and the data center are specified as information related to the VNF 70 of a rearrangement source from data stored when the VNF 70 is generated. The fact that the VNF type corresponding to the service ID and the VNF identification number "VNF_001" is "VNF 10," and the data center is "DC 2" is derived from Table T28 of FIG. 9(*e*) and the fact that the VNFM 30 of "VNF 10" is "VNFM 1" is derived from Table T3 of FIG. 5(*b*) (A, S103).

Next, in the orchestrator 20, a VNF identification number "VNF_010" is dispatched as a number for uniquely identifying the VNF 70 to be generated for rearrangement. Next, in the orchestrator 20, a signal (2) in which the service ID "service ID1" during generation received in the signal (1), the performance condition "100," the rearrangement source VNF identification number "VNF_001," the rearrangement VNF identification number "VNF_010," and the VNF type "VNF 10" are set is transmitted as a necessary resource inquiry (signal (2)) to "VNFM 1" which is the VNFM 30 of "VNF 10" read in the above-described A (S103) (S104).

The signal (2) is received in "VNFM 1." In "VNFM 1" receiving the signal (2), detailed information of "VNF 10" set in the VNF type of the signal (2) is read from the VNF detailed information database previously retained (registered) in the retention section 31 of the "VNFM 1." In the detailed information, resource information (VM), resource information (NW), and function information according to a VNF internal structure and a performance condition of Table T9 of FIG. 6 are registered.

In "VNFM 1," the resource information and the function information necessary for the performance condition "100" of the VNF type "VNF 10" received in the signal (2) are extracted from the read detailed information (Table T9 of FIG. 6) (C1', S105). The extracted information can be obtained as Table T20 of FIG. 10(*c*) as a combination of internal functional sections (C1', S105). In detail, it can be seen that "VNF 10" is constituted of the internal functional sections "VNFC 100" and "VNFC 101" from the read Table T9 of FIG. 6. Further, in the case of the performance condition "100," it can be seen that the internal functional section "VNFC 100" can be generated by virtual resources (VM and NW) of the model number "001" using the CPU performance "High" or the model number "002" using the CPU performance "Low" and the internal functional section "VNFC 101" can be generated by virtual resources (VM and NW) of the model number "005" using the CPU performance "High" or the model number "006" using the CPU performance "Low." Thereby, combinations of necessary virtual resources for generating the VNF 70 having the performance condition "100" of the VNF type "VNF 10" indicated by the signal (2) are of 4 types in which "VNFC 100" and "VNFC 101" are constituted of only the CPU performance "High," the CPU performance "High" and "Low," and only the CPU performance "Low." In "VNFM 1," the obtained resource information of Table T20 is set and is returned as a signal (3) to the orchestrator 20 (S106). In "VNFM 1," a rearrangement VNF type and a rearrangement VNF identification number are added to information stored during generation and stored on the basis of the service ID of the signal (2).

In the orchestrator 20, the signal (3) is received. The orchestrator 20 receiving the signal (3) selects a data center in which "VNF 10" can be arranged using the operation condition of Table T4 of FIG. 5(*c*), the NW condition input according to the signal (1), and the connection configuration of the data center of Table T5 of FIG. 5(*e*) to rearrange "VNF 10" specified in A (S103). Candidates "DC 2," "DC 3," "DC 4," and "DC 5" can be obtained as the data center in which "VNF 10" can be arranged from Table T4 of FIG. 5(*c*). Next, the candidate data centers are "DC 3" and "DC 5" based on connection information capable of being obtained from Table T5 of FIG. 5(*e*) in which data centers connected to "DC 2" in which the VNF 70 of a rearrangement source is arranged are "DC 1," "DC 3," and "DC 5" as data centers separate from "DC 2" of the rearrangement source VNF 70 from the input NW condition.

Next, the orchestrator 20 reads resource information of "DC 3" and "DC 5" serving as the candidates from Table T1 of FIG. 4(*a*) of the network total resource information database accumulated through periodic collection. The read resource information is shown in Table T31 of FIG. 11(*a*) (B', S107).

Next, in the orchestrator 20, an available data center is extracted by comparing the resource information of "DC 3" and "DC 5" (Table T31 of FIG. 11(*a*)) with Table T20 of FIG. 10(*c*) of necessary resource information received in the signal (3). Specifically, it is determined that "VNF 10" requires "function 1" and "function 2" from Table T20 of FIG. 10(*c*) and both "DC 3" and "DC 5" of candidates can provide "function 1" and "function 2" from Table T31 of FIG. 11(*a*).

Next, necessary resource information is derived to generate the VNF 70 in resources provided by an available data center. Specifically, from Table T31 of FIG. 11(*a*), it can be determined that "DC 3" can provide low CPU performance and "DC 5" can provide high CPU performance. This is collated with the CPU performance in a combination of Table T20 of FIG. 10(*c*) and Table T32 of FIG. 11(*b*) can be obtained as a combination of resource information capable of being obtained by "DC 3" and "DC 5" (C2', S108).

Next, in the orchestrator 20, the reservation request section 22 applies a priority index of Table T12 of FIG. 5(*f*) to a combination table (Table T32 of FIG. 11(*b*)) of resource information and data centers. It can be determined that the first priority is a bandwidth between data centers from Table T12 and a bandwidth between "DC 2" and "DC 3" is greater between the bandwidth between "DC 2" and "DC 3" and a bandwidth between "DC 2" and "DC 5" of the rearrangement source VNF 70 from Table T5 of FIG. 5(*e*). On the basis of this, the priority is assigned and Table T33 of FIG. 11(*c*) can be obtained (D, S109).

Next, reservation for the VIM 40 for managing the data center is performed in the order of combination of high priority. The reservation request section 22 sets the necessary resources of combination 1 of "DC 3" having highest priority in Table T33 of FIG. 11(*c*) and "DC 3" of the target and a resource reservation request is transmitted to "VIM 1" which is a management function of "DC 3" read from Table T6 of FIG. 5(*d*) (signal (4), S110, reservation request step). In the case of a combination of priority 1 of Table T33 of FIG. 11(*c*), information of Table T34 of FIG. 12(*a*) becomes necessary resource information (VM and NW). When the resource reservation fails, a reservation request of the combination of the next highest priority is generated (F, return from the process S113).

In "VIM 1," the signal (4) is received. In "VIM 1" receiving the signal (4), the reservation section 42 confirms whether necessary resources shown in Table T34 of FIG. 12(*a*) requested in the signal (4) can be secured in "DC 3" set in the signal (4) on the basis of an inside management area resource information database within a management area and a reservation number 10 for which the resources are reserved is dispatched (E, S111, reservation step). In "VIM 1," the reserved "DC 3" and reserved resource information are stored along with the reservation number 10. In "VIM 1," a reservation number serving as a response when the resources can be secured and an error serving as a response when the resources cannot be secured are provided to the orchestrator 20 (signal (5), S112).

In the orchestrator 20, the signal (5) from "VIM 1" is received. In the orchestrator 20 in which the signal (5) from "VIM 1" is received, a resource reservation result is confirmed (F, S113). When the reservation of the resources is impossible (F, NG of S113), reservation of a combination of the next highest priority is performed by returning to the process of D (S109) again.

When the reservation succeeds, the orchestrator 20 sets the service ID when the rearrangement source VNF 70 is generated and resource information of Table T34 of FIG. 12(*a*) serving as reservation resource information (VM and NW) and requests "VNFM 1" to provide arrangement/startup information and NW configuration information necessary for rearrangement of "VNF 10" (signal (6), S114). Also, in the orchestrator 20, the service ID, the VNF type, the VNF identification number, the reservation number, the reserved "VIM 1," and the reserved "DC 3" are stored as information of the rearrangement VNF.

In "VNFM 1," the detailed information output section 32 receives the signal (6). Next, the detailed information output section 32 reads Table T9 of FIG. 6 of the detailed information stored in C1' (S105) from the service ID received in the signal (6) and determines the arrangement/startup information and the NW (network) configuration information corresponding to the model numbers "002" and "006" of Table T34 of FIG. 12(*a*) of the reserved resource information (VM and NW) received in the signal (6). Next, the detailed information output section 32 dispatches and assigns a VM identification number to the generated virtual machine (VM).

Next, in "VNFM 1," the detailed information output section 32 sends a response of Table T35 of FIG. 12(*b*) associated with the reserved resource information as a signal (7) to the orchestrator (S116, detailed information output step). In "VNFM 1," the service ID, the VNF type, and the VNF identifier stored in C1' (S105) are associated with a VM identification number and an internal functional section and Table T42 of FIG. 9(*g*) is stored.

In the orchestrator 20, the virtual server generation request section 23 receives the signal (7). Next, the virtual server generation request section 23 reads "VIM 1," "DC 3," and reservation number 10 stored in S114. Next, the virtual server generation request section 23 confirms a type of "VIM 1" from Table T6 of FIG. 5(*d*) and changes a format of the arrangement/startup information and the NW configuration information of Table T35 of FIG. 12(*b*) received in the signal (7) according to the VIM type (rewrites detailed information according to a management scheme of the VIM 40) (I, S117, virtual server generation request step).

Next, the virtual server generation request section 23 requests "VIM 1" to generate "VNF 10" through a signal (8) in which the arrangement/startup information and the NW configuration information for which the format is changed for "VIM 1" and the read reservation number 10 is set (S118, virtual server generation request step). Information set as the arrangement/startup information and the NW configuration information becomes Table T35 of FIG. 12(*b*).

In "VIM 1," the virtual server generation section 43 receives the signal (8). Next, the virtual server generation section 43 specifies resources of "DC 3" secured in the process of E (S111) as resources for starting up the VNF 70 from a reservation number received in the signal (8). Next, the virtual server generation section 43 reads image files of a VM and VNF in "DC 3" on the basis of the arrangement/startup information and the NW configuration information of Table T35 received in the signal (8) and generates/starts up the VM and the VNF 70.

In "VIM 1," the virtual server generation section 43 assigns "external IP address 10" and "external IP address 11" as a number of external addresses designated in the signal (8) to a VM from a pre-allocated external IP address band. In "VIM 1," information of Table T41 of FIG. 14 is stored by associating the reservation number of E (S111), the data center, the VM identification number of "VNFM 1," and the physical apparatus (HW) (H, S119, virtual server generation step).

Next, the virtual server generation section 43 provides the orchestrator 20 with a response of Table T36 of FIG. 12(*c*) in which an external IP address allocated during VM generation is set as the NW (network) information in a signal (9) (S120 of FIG. 18).

In the orchestrator 20, the signal (9) is received. In the orchestrator 20 receiving the signal (9), it is confirmed that the generation of the VNF 70 of the rearrangement target is completed. In the orchestrator 20, the VM identification number and the NW information set in the signal (9) as the information of the VNF 70 stored in the process of S114 is added to Table T28 of FIG. 9(*e*) created during generation and stored. Content of the information becomes Table T40 of FIG. 10(*b*) (J, S121).

NW information of "VNF 21" which is the VNF 70 to which the rearrangement source VNF 70 is connected is read from Table T40 and the NW connection to the rearranged VNF 70 is performed. A connection request in which "external IP address 20" for communication of "VNF 21" read from Table T40 and "external IP address 10" for communication of the enhanced "VNF 10" received in the signal (9) are set is sent to "VIM-NW" to manage a network between VNFs 70 specified from Table T6 of FIG. 5(*d*) (signal (10), S122). In "VIM-NW," the signal (10) is received and a response to the signal (10) is transmitted to the orchestrator 20 (S123). In "VIM-NW" in which the signal (10) is received, connections of "external IP address 20" and external IP address 10" are performed (L, S124).

In the orchestrator 20, a response (S123) from "VIM-NW" for the connection request of S122 is received. Next, when the connection between the VNFs 70 is completed, the orchestrator 20 notifies the OSS 51 of the NW information, the performance, the VNF type, and the VNF identification number of "VNF 10" received in the signal (9) using a signal (11) (S125). The OSS 51 receives the signal (11) and retains Table T39 of FIG. 13 in which request content of the signal (1) and a result of the signal (11) are associated and appended to Table T29 of FIG. 10(a) of the generation time (M, S126). Thereafter, the OSS 51 resumes the operation by notifying "VNF 21" of NW information of the rearranged "VNF 10" through the EMS 80 for a notification of switching of the opposite "VNF 10." After confirming that communication of the rearranged "VNF 10" and VNF 21" of a connection destination starts, the OSS 51 starts a maintenance operation such as stop or termination. The above process is a process when (2) auto-healing is performed.

Figure 19:
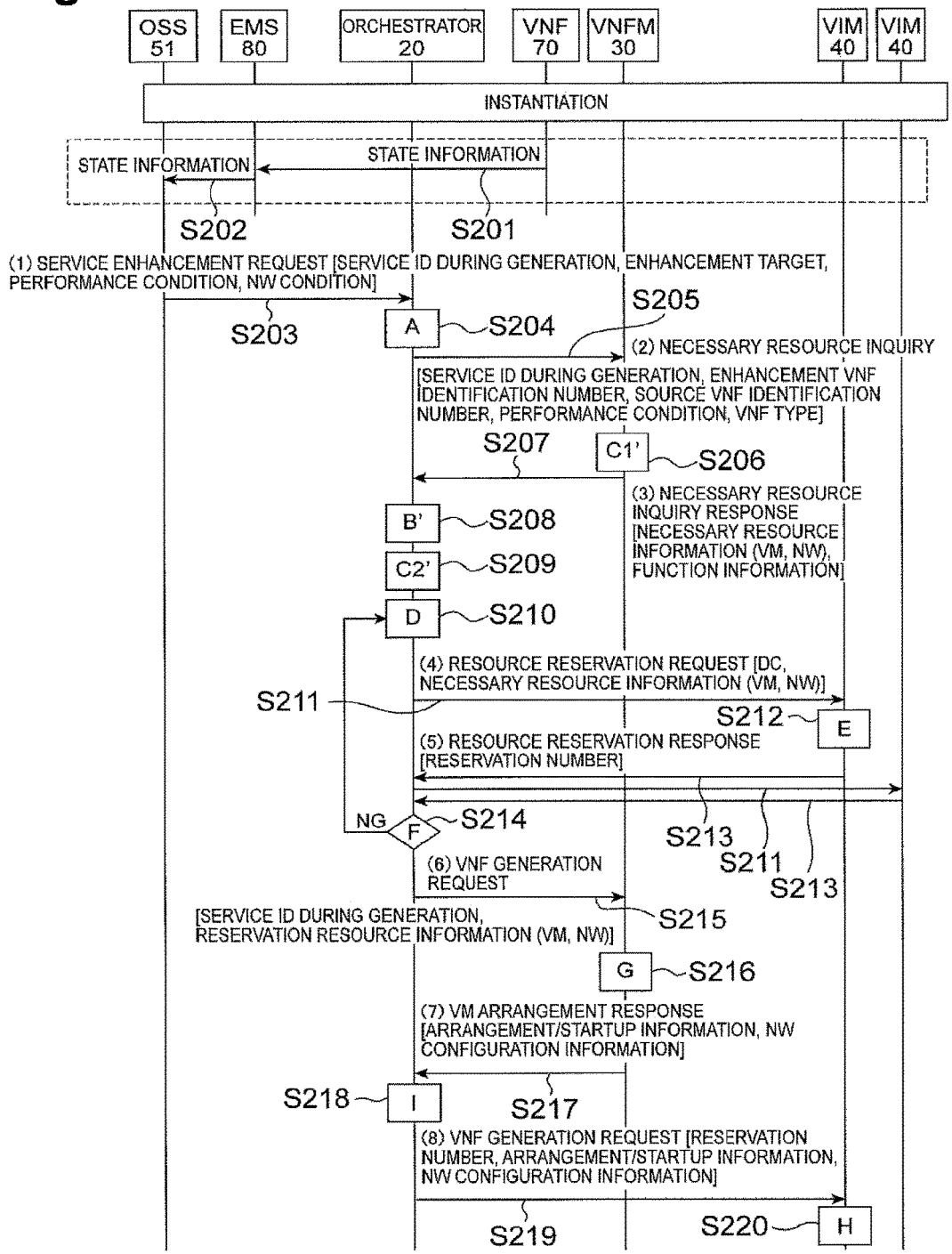
FIG. 19 is a sequence diagram illustrating a process (management method) to be executed during scale-out in the management system according to an embodiment of the present invention.
Figure 20:
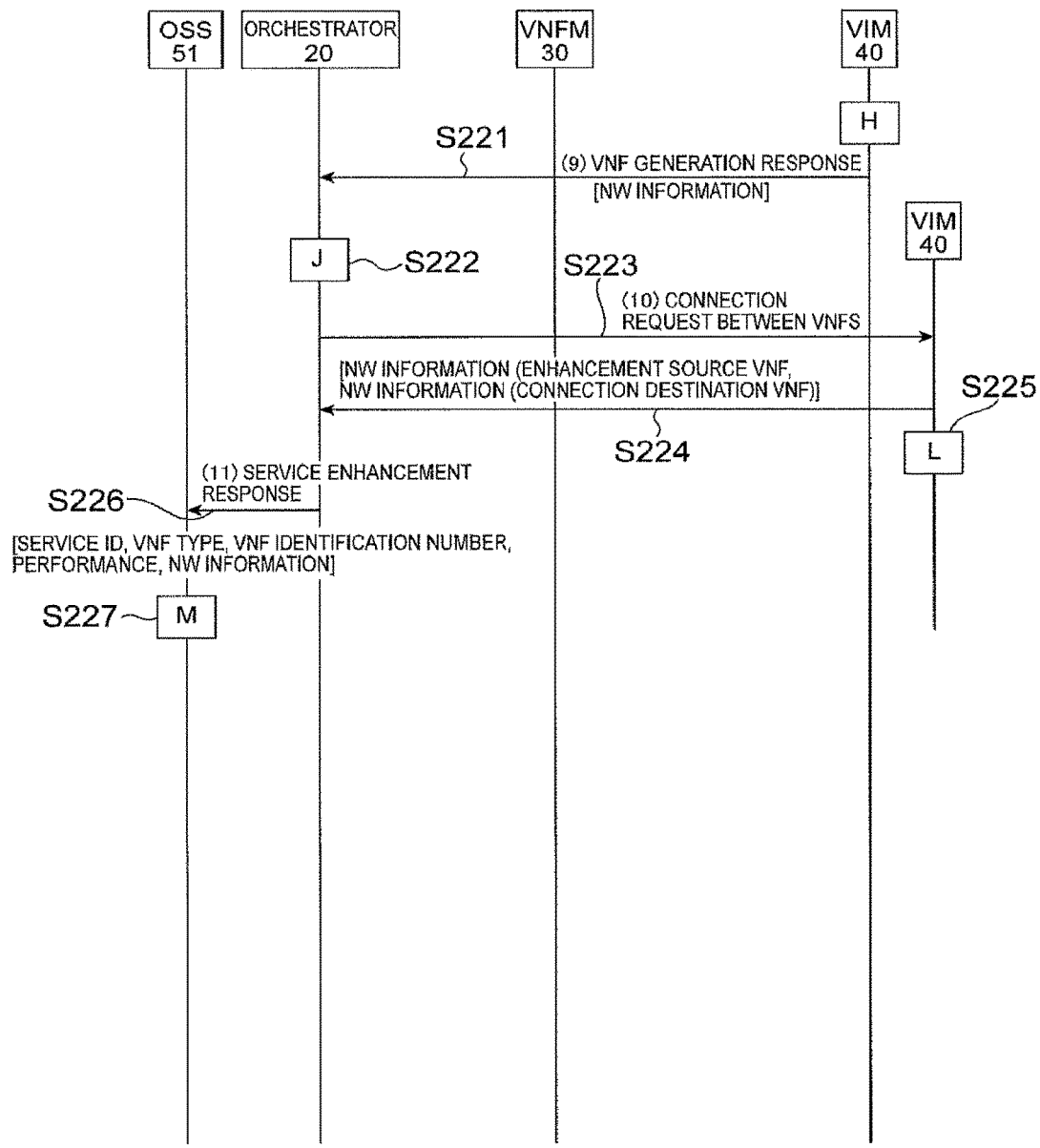
FIG. 20 is a sequence diagram illustrating a process (management method) to be executed during scale-out in the management system according to an embodiment of the present invention.

Next, a process when (3) scale-out is performed using the sequence diagrams of FIGS. 19 and 20 will be described. Also, the sequence diagram illustrated in FIG. 20 is a continuation of the sequence diagram illustrated in FIG. 19 (in a time-series manner). In the scale-out, a VNF 70 having the same function as a relevant VNF 70 is generated in order to distribute a load of the VNF 70 when the load of the VNF 70 increases. According to the scale-out, an appropriate load distribution or the like is performed in the mobile communication system 1.

The OSS 51 operates while monitoring a state of the VNF 70 generated in an instantiation process (procedure) through the EMS 80 which is an operation management system as in the conventional system. The EMS 80 receives a notification of state information from the VNF 70 (S201) and transmits the received state information to the OSS 51 (S202). The above-described process is performed periodically. On the basis of the state information during the operation, the OSS 51 can detect a load increase of the VNF 70 and enhance the performance of the VNF 70 having an increased load greater than a given level during the operation. An example in which the OSS 51 detecting the load increase of "VNF 10" between "VNF 10" and "VNF 21" generated in the instantiation process determines the enhancement of 100% of the performance of the VNF 70 and sends a request to the orchestrator 20 will be described.

A signal (1) in which a service ID used when an enhancement source VNF 70 is generated, a VNF identification number "VNF_001" for identifying an enhancement target, "100" which is a performance condition indicating performance to be enhanced (for example, a performance index value equivalent to that of a current state), and a "separate DC" indicating the installation for a DC separate from the current DC as the NW condition are set is transmitted from the OSS 51 to the orchestrator 20 (S203).

In the orchestrator 20, the request reception section 21 receives a service enhancement request (S203, request reception step). In the orchestrator 20 receiving the service enhancement request, the service ID and the VNF identification number are used and the VNF type and the data center are specified as information related to the VNF 70 of an enhancement source from data stored when the VNF 70 is generated. The fact that the VNF type corresponding to the service ID and the VNF identification number "VNF_001" is "VNF 10," and the data center is "DC 2" is derived from Table T28 of FIG. 9(e) and the fact that the VNFM 30 of "VNF 10" is "VNFM 1" is derived from Table T3 of FIG. 5(b) (A, S204).

Next, in the orchestrator 20, a VNF identification number "VNF_010" is dispatched as a number for uniquely identifying the VNF 70 to be generated for enhancement. Next, in the orchestrator 20, a signal (2) in which the service ID "service ID1" during generation received in the signal (1), the performance condition "100," the enhancement source VNF identification number "VNF_001," the enhancement VNF identification number "VNF_010," and the VNF type "VNF 10" are set is transmitted as a necessary resource inquiry (signal (2)) to "VNFM 1" which is the VNFM 30 of "VNF 10" read in the above-described A (S203) (S205).

The signal (2) is received in "VNFM 1." In "VNFM 1" receiving the signal (2), detailed information of "VNF 10" set in the VNF type of the signal (2) is read from the VNF detailed information database previously retained (registered) in the retention section 31 of the "VNFM 1." In the detailed information, resource information (VM), resource information (NW), and function information according to a VNF internal structure and a performance condition of Table 19 of FIG. 6 are registered.

In "VNFM 1," the resource information and the function information necessary for the performance condition "100" of the VNF type "VNF 10" received in the signal (2) are extracted from the read detailed information (Table T9 of FIG. 6) (C1', S206). The extracted information can be obtained as Table T20 of FIG. 10(c) as a combination of internal functional sections (C1', S206). In detail, it can be seen that "VNF 10" is constituted of the internal functional sections "VNFC 100" and "VNFC 101" from the read Table T9 of FIG. 6. Further, in the case of the performance condition "100," it can be seen that the internal functional section "VNFC 100" can be generated by virtual resources (VM and NW) of the model number "001" using the CPU performance "High" or the model number "002" using the CPU performance "Low" and the internal functional section "VNFC 101" can be generated by virtual resources (VM and NW) of the model number "005" using the CPU performance "High" or the model number "006" using the CPU performance "Low." Thereby, combinations of necessary virtual resources for generating the VNF 70 having the performance condition "100" of the VNF type "VNF 10" indicated by the signal (2) are of 4 types in which "VNFC 100" and "VNFC 101" are constituted of only the CPU performance "High," the CPU performance "High" and "Low," and only the CPU performance "Low." In "VNFM 1," the obtained resource information of Table T20 is set and returned as a signal (3) to the orchestrator 20 (S207). In "VNFM 1," enhancement VNF type and an enhancement VNF identification number are added to information stored during generation and stored on the basis of the service ID of the signal (2).

In the orchestrator 20, the signal (3) is received. The orchestrator 20 selects a data center in which "VNF 10" can be arranged using the operation condition of Table T4 of FIG. 5(c), the NW condition input according to the signal (1), and the connection configuration of the data center of Table T5 of FIG. 5(e) to enhance "VNF 10" specified in A (S204). Candidates "DC 2," "DC 3," "DC 4," and "DC 5" can be obtained as the data center in which "VNF 10" can be arranged from Table T4 of FIG. 5(c). Next, the candidate data centers become "DC 3" and "DC 5" based on connection information capable of being obtained from Table T5 of FIG. 5(e) in which data centers connected to "DC 2" in which the VNF 70 of an enhancement source is arranged are "DC 1," "DC 3," and "DC 5" as data centers separate from "DC 2" of the enhancement source VNF 70 from the input NW condition.

Next, the orchestrator 20 reads resource information of "DC 3" and "DC 5" serving as the candidates from Table T1 of FIG. 4(*a*) of the network total resource information database accumulated through periodic collection. The read resource information is shown in Table T31 of FIG. 11(*a*) (B', S208).

Next, in the orchestrator 20, an available data center is extracted by comparing the resource information of "DC 3" and "DC 5" (Table T31 of FIG. 11(*a*)) with Table T20 of FIG. 10(*c*) of necessary resource information received in the signal (3). Specifically, it is determined that "VNF 10" requires "function 1" and "function 2" from Table T20 of FIG. 10(*c*) and both "DC 3" and "DC 5" of candidates can provide "function 1" and "function 2" from Table T31 of FIG. 11(*a*).

Next, necessary resource information is derived to generate the VNF 70 in resources provided by an available data center. Specifically, from Table T31 of FIG. 11(*a*), it can be determined that "DC 3" can provide low CPU performance and "DC 5" can provide high CPU performance. This is collated with the CPU performance in a combination of Table T20 of FIG. 10(*c*) and Table T32 of FIG. 11(*b*) can be obtained as a combination of resource information capable of being obtained by "DC 3" and "DC 5" (C2', S209).

Next, in the orchestrator 20, the reservation request section 22 applies a priority index of Table T12 of FIG. 5(*f*) to a combination table (Table T32 of FIG. 11(*b*)) of resource information and data centers. It can be determined that the first priority is a bandwidth between data centers from Table T12 and a bandwidth between "DC 2" and "DC 3" is greater between the bandwidth between "DC 2" and "DC 3" and a bandwidth between "DC 2" and "DC 5" of the rearrangement source VNF 70 from Table T5 of FIG. 5(*e*). On the basis of this, the priority is assigned and Table T33 of FIG. 11(*c*) can be obtained (D, S210).

Next, reservation of the VIM 40 for managing the data center is performed in the order of combination of high priority. The reservation request section 22 sets the necessary resources of combination 1 of "DC 3" having highest priority in Table T33 of FIG. 11(*c*) and "DC 3" of the target and a resource reservation request is transmitted to "VIM 1" which is a management function of "DC 3" read from Table T6 of FIG. 5(*d*) (signal (4), S211, reservation request step). In the case of a combination of priority 1 of Table T33 of FIG. 11(*c*), information of Table T34 of FIG. 12(*a*) becomes necessary resource information (VM and NW). When the resource reservation fails, a reservation request of the combination of the next highest priority is generated (F, return from the process S214).

In "VIM 1," the signal (4) is received. In "VIM 1" receiving the signal (4), the reservation section 42 confirms whether necessary resources shown in Table T34 of FIG. 12(*a*) requested in the signal (4) can be secured in "DC 3" set in the signal (4) on the basis of an inside management area resource information database within a management area and a reservation number 10 for which the resources are reserved is dispatched (E, S212, reservation step). In "VIM 1," the reserved "DC 3" and reserved resource information are stored along with the reservation number 10. In "VIM 1," a reservation number serving as a response when the resources can be secured and an error serving as a response when the resources cannot be secured are provided to the orchestrator 20 (signal (5), S213).

In the orchestrator 20, the signal (5) from "VIM 1" is received. In the orchestrator 20 in which the signal (5) from "VIM 1" is received, a resource reservation result is confirmed (F, S214). When the reservation of the resources is impossible (F, NG of S214), a reservation of a combination of the next highest priority is performed by returning to the process of D (S210) again.

When the reservation succeeds, the orchestrator 20 sets the service ID when the enhancement source VNF 70 is generated and resource information of Table T34 of FIG. 12(*a*) serving as reservation resource information (VM and NW) and requests "VNFM 1" to provide arrangement/startup information and NW configuration information necessary for enhancement of "VNF 10" (signal (6), S215). Also, in the orchestrator 20, the service ID, the VNF type, the VNF identification number, the reservation number, the reserved "VIM 1," and the reserved "DC 3" are stored as information of the enhancement VNF.

In "VNFM 1," the detailed information output section 32 receives the signal (6). Next, the detailed information output section 32 reads Table T9 of FIG. 6 of the detailed information stored in C1' (S206) from the service ID received in the signal (6) and determines the arrangement/startup information and the NW (network) configuration information corresponding to the model numbers "002" and "006" of Table T34 of FIG. 12(*a*) of the reserved resource information (VM and NW) received in the signal (6). Next, the detailed information output section 32 dispatches and assigns a VM identification number to the generated virtual machine (VM) (G, 216).

Next, in "VNFM 1," the detailed information output section 32 sends a response of Table T35 of FIG. 12(*b*) associated with the reserved resource information as the signal (7) to the orchestrator 20 (S217, detailed information output step). In "VNFM 1," the service ID, the VNF type, and the VNF identifier stored in C1' (S206) are associated with a VM identification number and an internal functional section and Table T42 of FIG. 9(*g*) is stored.

In the orchestrator 20, the virtual server generation request section 23 receives the signal (7). Next, the virtual server generation request section 23 reads "VIM 1," "DC 3," and reservation number 10 stored in S215. Next, the detailed information output section 32 confirms a type of "VIM 1" from Table T6 of FIG. 5(*d*) and changes a format of the arrangement/startup information and the NW configuration information of Table T35 of FIG. 12(*b*) received in the signal (7) according to the VIM type (rewrites detailed information according to a management scheme of the VIM 40) (I, S218, virtual server generation request step).

Next, the virtual server generation request section 23 requests "VIM 1" to generate "VNF 10" through a signal (8) in which the arrangement/startup information and the NW configuration information for which the format is changed for "VIM 1" and the read reservation number 10 is set (S219, virtual server generation request step). Information set as the arrangement/startup information and the NW configuration information becomes Table T35 of FIG. 12(*b*).

In "VIM 1," the virtual server generation section 43 receives the signal (8). Next, the virtual server generation section 43 specifies resources of "DC 3" secured in the process of E (S212) as resources for starting up the VNF 70 from a reservation number received in the signal (8). Next, the virtual server generation section 43 reads image files of VM and VNF in "DC 3" on the basis of the arrangement/startup information and the NW configuration information of Table T35 received in the signal (8) and generates/starts up VM and the VNF 70.

In "VIM 1," the virtual server generation section 43 assigns "external IP address 10" and "external IP address 11" as a number of external addresses designated in the signal (8) to a VM from a pre-allocated external IP address band. In "VIM 1," information of Table T41 of FIG. 14 is stored by associating the reservation number of E (S212), the data center, the VM identification number of "VNFM 1," the allocated resource information, and the physical apparatus (HW) (II, S220, virtual server generation step).

Next, the virtual server generation section 43 provides the orchestrator 20 with a response of Table T36 of FIG. 12(c) in which an external IP address allocated during VM generation is set as the NW (network) information in a signal (9) (S221 of FIG. 20).

In the orchestrator 20, the signal (9) is received. In the orchestrator 20 receiving the signal (9), it is confirmed that the generation of the enhancement target of the VNF 70 is completed. In the orchestrator 20, the VM identification number and the NW information set in the signal (9) as the information of the VNF 70 stored in the process of S215 are added to Table T28 of FIG. 9(e) created during generation and stored. Content of the information becomes Table T40 of FIG. 10(b) (J, S222).

NW information of "VNF 21" which is the VNF 70 to which the enhancement source VNF 70 is connected is read from Table T40 and the NW connection to the enhanced VNF 70 is performed. A connection request in which "external IP address 20" for communication of "VNF 21" read from Table T40 and "external IP address 10" for communication of the enhanced "VNF 10" received in the signal (9) are set is sent to "VIM-NW" to manage a network between VNFs 70 specified from Table T6 of FIG. 5(d) (signal (10), S223). In "VIM-NW," the signal (10) is received and a response to the signal (10) is transmitted to the orchestrator 20 (S224). In "VIM-NW" in which the signal (10) is received, connections of "external IP address 20" and "external IP address 10" are performed (L, S225).

In the orchestrator 20, a response (S224) from "VIM-NW" for the connection request of S223 is received. Next, when the connection between the VNFs 70 is completed, the orchestrator 20 notifies the OSS 51 of the NW information, the performance, the VNF type, and the VNF identification number of the enhanced "VNF 10" received in the signal (9) using a signal (11) (S226). The OSS 51 receives the signal (11) and retains Table T39 of FIG. 13 in which request content of the signal (1) and a result of the signal (11) are associated and appended to Table T29 of FIG. 10(a) of the generation time (M, S227). The above process is a process when (3) scale-out is performed.

Next, a process when (4) scale-in is performed using the sequence diagrams of FIGS. 21 and 22 will be described. Also, the sequence diagram illustrated in FIG. 22 is a continuation of the sequence diagram illustrated in FIG. 21 (in a time-series manner). In the scale-in, VNFs 70 may be aggregated when there are a plurality of VNFs 70 having the same function with a low load or the like. According to the scale-in, the appropriate use of resources is performed in the mobile communication system 1.

The OSS 51 operates while monitoring a state of the VNF 70 that is generated in an instantiation process (procedure) through the EMS 80 which is an operation management system as in the conventional system and is further enhanced in the scale-out process (procedure). The EMS 80 receives a notification (signal (1)) of state information from the VNF 70 (S301) and transmits the received state information (signal (1)) to the OSS 51 (S302). The above-described process is performed periodically. On the basis of the state information during the operation, the OSS 51 can detect a load decrease of VNF and reduce the performance of the VNF 70 having a decreased load less than a given level during the operation. An example in which the OSS 51 detecting the decreased load less than the given level for a plurality of "VNFs 10" enhanced in the above-described scale-out process determines the reduction of the total performance of the VNF 70 and sends a request to the orchestrator 20 will be described.

In the OSS 51, management is performed as shown in Table T39 of FIG. 13 for a service type of the VNF 70 generated, enhanced, or reduced through the orchestrator 20.

Even when a load amount of the VNF 70 is periodically collected from the VNF 70 as in the above-described signal (1) and VNFs 70 having the same function are integrated in the OSS 51, scale-in integration of distributed processing is determined as long as a load sufficiently falls within a rated load. For example, in the OSS 51, a VNF having a smaller load amount among a plurality of VNFs 70 ("VNF_001" and "VNF_010") acquired in the signal (1) (message (1)) becomes a deletion target (A, S303).

In the OSS 51, Table T39 of FIG. 13 is referred to, an opposite node ("VNF_021" in Table T39) connected to the VNF 70 serving as the deletion target is determined in the same service, and a configuration change is indicated by a signal (2) via the EMS 80 so that newly generated traffic for the opposite node is not transmitted to the VNF 70 ("VNF_010") of the deletion target (S304 and S305).

The signal (2) is received in "VNF_021," the configuration change is performed so that no new traffic is transmitted to the VNF 70 ("VNF_010") of the deletion target for traffic for which the load is distributed to "VNF_001" and "VNF_010" opposite to each other (S306), and a response message (3) (signal (3)) is returned to the OSS 51 via the EMS 80 (S307 and S308).

In the OSS 51, the response message (3) (signal (3)) is received. Next, in the OSS 51, the VNF 70 ("VNF_010") serving as the deletion target is obstructed by a message (4) (signal) via the EMS 80 and a user expulsion request is generated (S309 and S310).

In "VNF_010," the completion of a process on already accommodated user traffic is awaited (or the process is forcibly terminated) and the process converges (C, S311). Next, a response message (5) (signal (5)) is returned from "VNF_010" to the OSS 51 via the EMS 80 (S312 and S313).

In the OSS 51, the response message (5) (signal (5)) is received. Next, in the OSS 51, a signal (6) in which the service ID used during VNF generation, a VNF identification number "VNF_010" for identifying a reduction target, a performance condition indicating performance to be reduced, and "100" which is a performance value desired to be reduced are set is generated (S314) and transmitted as a service reduction request to the orchestrator 20 (S315 of FIG. 22).

In the orchestrator 20, a service reduction request is received. In the orchestrator 20 receiving the service reduction request, the service ID and the VNF identification number are used and the VNF type and the data center are specified as information related to the VNF 70 of the reduction target from data stored when the VNF 70 is created or enhanced. The fact that the VNF type corresponding to the service ID and the VNF identification number "VNF_010" is "VNF 10," and the data center is "DC 3" is derived from Table T40 of FIG. 10(b) and the fact that the VNFM 30 of "VNF 10" is "VNFM 1" is derived from Table T3 of FIG. 5(b) (E, S316).

Next, the orchestrator 20 can obtain a service ID when the VNF 70 serving as the deletion target is generated, the VNF type serving as the deletion target, the VNF identification number, the VIM identification number ("VIM 1") of the reservation destination, and the reservation number ("10") from Table T40 of FIG. 10(b) in order to delete the above-described specified "VNF_010" (F, S317). The orchestrator 20 requests "VNFM 1" to delete "VNF_010" by a signal (7) including the information (S318).

In "VNFM 1," the signal (7) is received. In "VNFM 1," the service ID, the VNF type, the VNF identification number, the VIM identification number, and the reservation number can be obtained from the VNF reduction request message received in the signal (7) (G, S319). Next, in "VNFM 1," a reduction procedure is obtained from Table T9 of FIG. 6 from the above-described information and returned to the orchestrator 20 (signal (8), S320).

In the orchestrator 20, the signal (8) is received. In the orchestrator 20, the reservation number, the VM identification information, and the reduction procedure are obtained from a VNF reduction information response message received in the signal (8) (H, S321) and a VNF reduction request is transmitted to "VIM 1" (signal (9), S322).

In "VIM 1," the signal (9) is received. In "VIM 1," the reservation number can be obtained from the VNF reduction request message received in the signal (9) and the reduction of VM is executed by obtaining the DC number "DC 3" serving as the deletion target and the VM identification number from Table T41 of FIG. 14 (J, S323). Next, in "VIM 1," a VNF reduction response is returned to the orchestrator 20 by a signal (10) (S324).

In the orchestrator 20, the VNF reduction response (VNF deletion response message) is received. Next, in the orchestrator 20, a release request of a connection between VNFs 70 performing deletion is generated from Table T40 of FIG. 10(b) (K, S325) and transmitted to "VIM-NW" by a signal (11) (S326).

In "VIM-NW," the signal (11) is received and a response to the release request is performed (S327). Also, in "VIM-NW," the connection between VNFs 70 is released (L, S328).

In the orchestrator 20, the response from "VIM-NW" is received and the service reduction response is sent to the OSS 51 by a signal (12) (S329). Table T28 of FIG. 9(e) obtained by deleting "VNF_010" from Table T40 of FIG. 10(b) is retained.

In the OSS 51, the request content of the signal (1) and the result of the signal (11) are associated and information of Table T29 of FIG. 10(b) obtained by reducing VNF from Table T39 of FIG. 13 is retained. The above process is a process when (4) scale-in is performed.

Although an enhancement/reduction procedure is shown in units of virtual communication functions (VNFs 70) in the above-described embodiment, the VNF 70 is generally constituted of one or more internal functional sections (VNFCs) and an enhancement/reduction operation is also executed in units of internal functional sections.

In the above-described present embodiment, VNF detailed information (Table T9 of FIG. 6) in common with instantiation in scale-out, scale-in, and auto-healing is used. However, enhancement/reduction of a unit of an internal functional section is possible if a procedure of extracting an enhancement/reduction pattern of the internal functional section which satisfies a performance condition designated on the basis of a combination of internal functional sections of the VNF 70 previously registering and generating (starting up) the enhancement/reduction pattern of the unit of the internal functional section as VNF detailed information is added.

At this time, it is necessary to designate a VNF identification number for identifying an operation target of a unit of a VNF as an identifier capable of specifying an operation of the unit of the internal functional section. For example, the upper-limit number of internal functional sections (Table TX of FIG. 26(a)) within one VNF and an enhancement/deletion pattern of a unit of a VNF internal function (Table TY of FIG. 26(b)) are additionally pre-registered as detailed information in the database of the VNFM 30.

Figure 24:
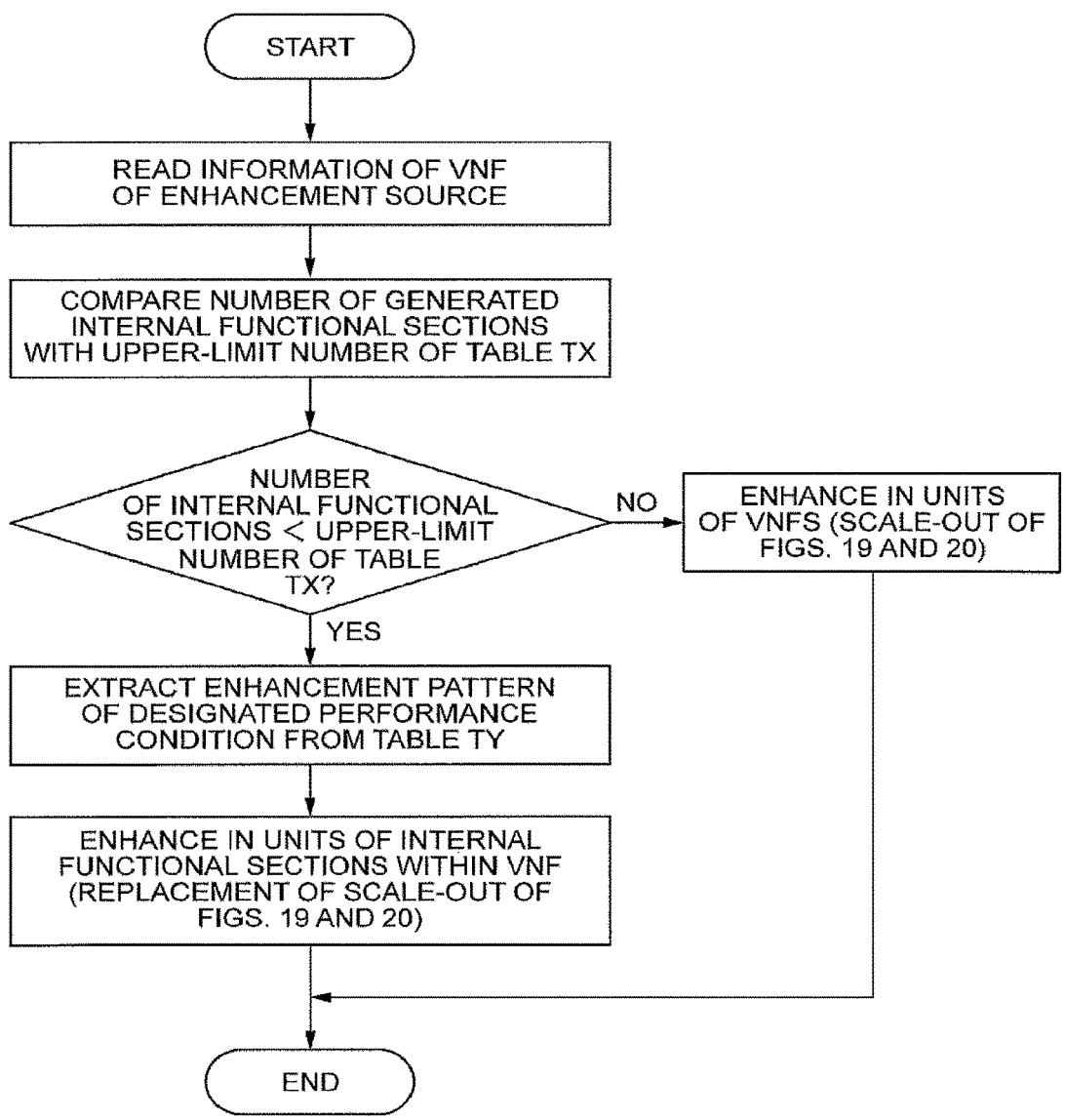
FIG. 24 is a flowchart illustrating a process of determining a unit of enhancement.

The scale-out process is performed as follows. When detailed information of an enhancement source VNF is read in a process (procedure) C1 in the scale-out process of FIG. 19, a determination of the enhancement unit illustrated in the flowchart of FIG. 24 is added. An example in which the performance condition "100" is received as the enhancement of VNF 10 in the signal (2) of S205 will be described. The detailed information (Table T27 of FIG. 9(d)) of the enhancement source VNF is read in the process (procedure) C1', the number of VMs of the enhancement source VNF is compared with the upper-limit number of Table TX of FIG. 26(a), and it is determined that the enhancement of the unit of VNFC is performed when the number of VMs is less than the upper-limit number. Next, a configuration of the model number "101" is extracted as resource information and function information necessary for the performance condition "100" from Table TY of FIG. 26(b) pre-registered in the VNFM 30.

Whether the unit of enhancement is designated as the unit of the VNF 70 or the unit of the internal functional section can be indicated from the OSS 51 without being determined by the VNFM 30. After the enhancement pattern of the unit of the internal functional section is extracted from Table TY, a similar procedure to the embodiment of the above-described scale-out is applied.

Figure 25:
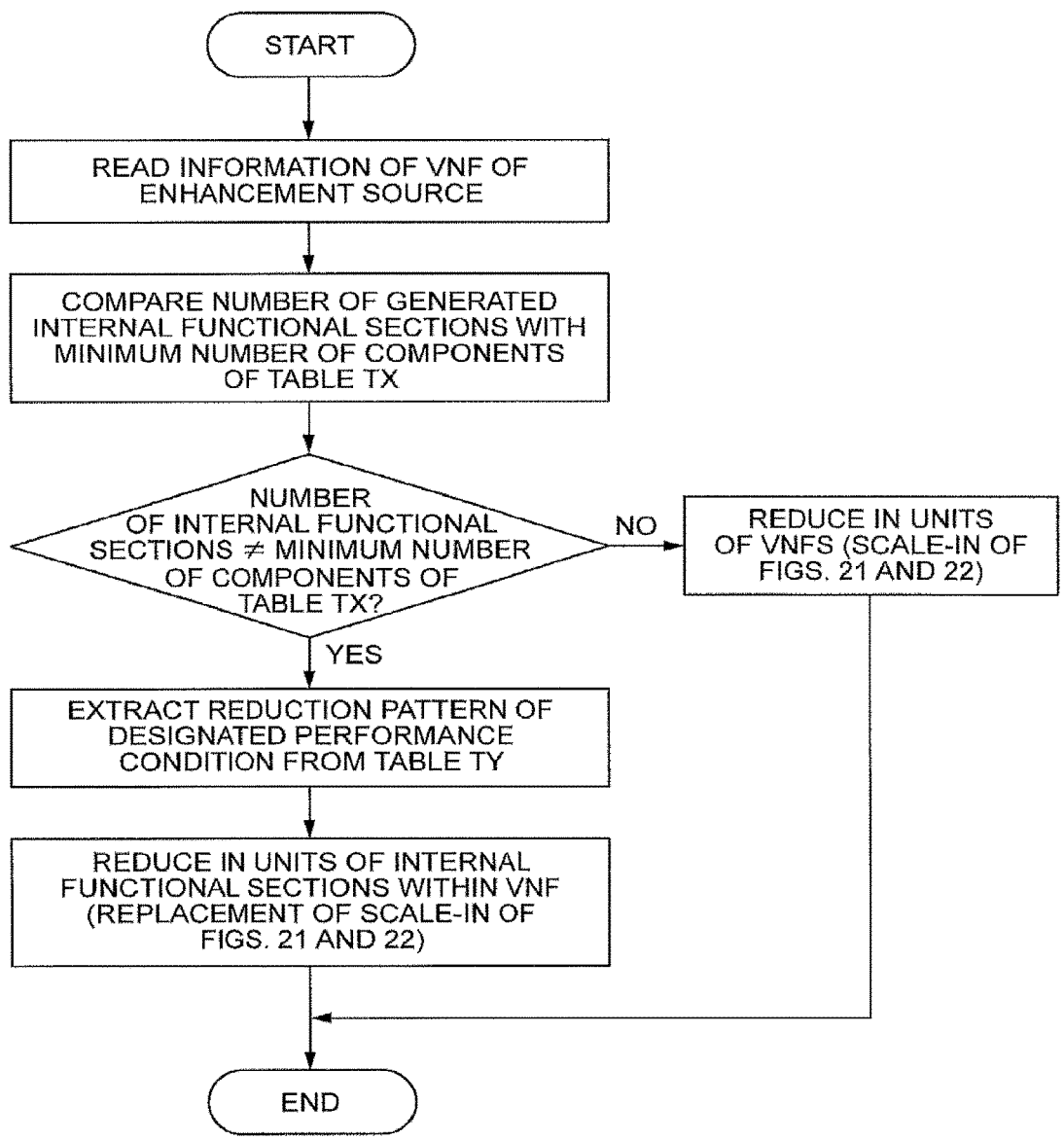
FIG. 25 is a flowchart illustrating a process of determining a unit of reduction.

The scale-in process is performed as follows. When detailed information of the reduced VNF is read in the process (procedure) G in the scale-in process of FIG. 22, the determination of a unit of reduction illustrated in the flowchart of FIG. 25 is added and one reduction pattern is extracted. For the VNFM 30 to determine the unit of reduction, the OSS 51 sends a request to the VNFM 30 by including the performance condition "100" received in the signal (6) in the signal (7) in the sequence diagram of FIG. 22. The VNFM 30 can obtain the VNF identification number and the performance condition from the received signal (7). The VNFM 30" reads detailed information (Table T42 of FIG. 9(a)) of a reduction source VNF to be retained on the basis of the VNF identification number received in the signal (7), compares the number of VMs of the reduction source VNF with the minimum number of components of the table of FIG. 26(a), and it is determined that the reduction of the unit of VNFC is performed in the case of a minimum configuration. Next, a configuration of the model number "101" is extracted as resource information and function information corresponding to the performance condition "100" from Table TY of FIG. 26(b) pre-registered in the VNFM 30 and resources of the reduction target and the procedure are obtained.

Whether the unit of reduction is designated as the unit of the VNF 70 or the unit of the internal functional section can be indicated from the OSS 51 without being determined by the VNFM 30. After the reduction pattern of the unit of the internal functional section is extracted from Table TY, a similar procedure to the embodiment of the above-described scale-in is applied.

The relationship between the unit of a performance increase/decrease of a virtualization function and an embodiment is illustrated in FIG. 27.

Figure 28:
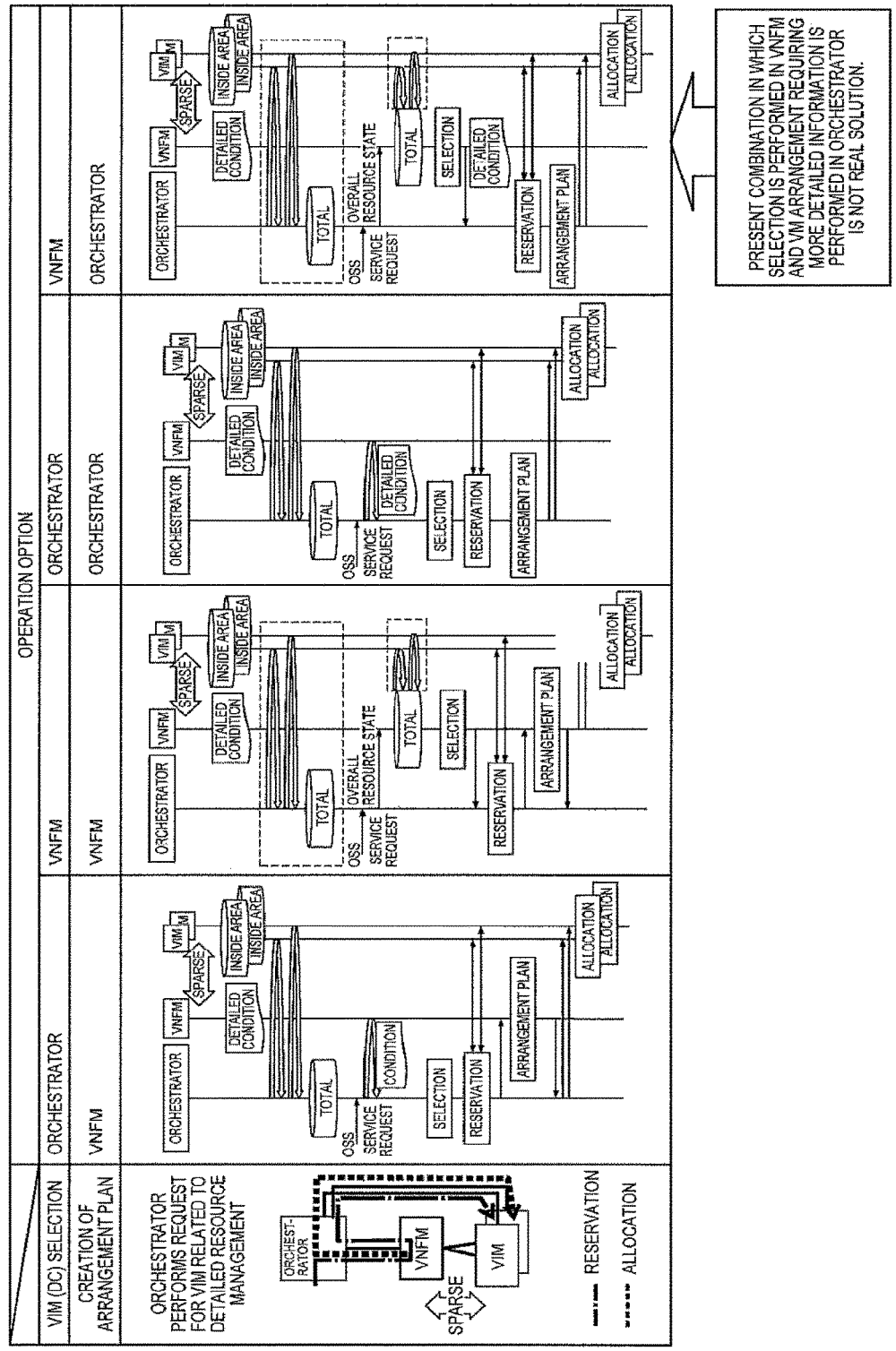
FIG. 28 is a diagram illustrating a variation of the embodiment of the present invention.

A variation of the embodiment of the present invention is illustrated in FIG. 28. In FIG. 28, the term "selection" refers to the extraction of a resource area (VIM 40/data center) serving as a candidate. The term "reservation" refers to making a request for resource reservation from a candidate area. The term "arrangement plan" refers to arrangement plan creation of the VNF 70 for reserved resources. The term "allocation" refers to the allocation of resources (generation of the VNF 70) based on the arrangement plan. The term "detailed condition" refers to the condition for creating the arrangement plan. The term "condition" refers to the condition obtained by abstracting the detailed condition. The term "total" refers to total resource information. The term "inside an area" refers to resource information inside a management area. Also, as shown in an area indicated by a broken line in FIG. 28, resource information which is not proprietary can be obtained through any path.

The above-described embodiment has a pattern in which the VNFM 30 selects the VIM 40 (data center), the VNFM 30 generates the arrangement plan of the VNF 70, and the VNFM 30 instructs that the VNF 70 for the VIM 40 be generated (a first pattern from the left among patterns of FIG. 28). However, a pattern in which the selection of the VIM (data center) 40 is performed by the VNFM 30 in place of the orchestrator 20 (a second pattern from the left among the patterns of FIG. 28) may be provided. Also, a pattern in which the generation of an arrangement plan of the VNF 70 is performed by the orchestrator 20 in place of the VNFM 30 may be provided (a third pattern from the left among the patterns of FIG. 28). Also, a combination in which the selection is performed in the VNFM 30 and a VM arrangement requiring more detailed information is performed in the orchestrator 20 (a fourth pattern from the left of the pattern of FIG. 28) is not a real solution.

In the management system 10 according to the present embodiment, it is necessary for the orchestrator 20 to rewrite detailed information (specifically, the arrangement/startup information and NW configuration information of Table T9 of FIG. 6) according to the virtualization resource management scheme and generate the VNF 70 for the VIM 40 using the rewritten detailed information. Accordingly, it is unnecessary for the VNFM 30 to perform a process according to the virtualization resource management scheme. Thereby, according to the management system 10 according to the present embodiment, it is possible to implement the VNF 70 for executing a communication process on virtualization resources without being inefficient even when different virtualization resource management schemes are included. For example, it is unnecessary for a vendor for providing the VNFM 30 to consider the virtualization resource management scheme. Thereby, it is unnecessary to provide the VNFM 30 according to the virtualization resource management scheme and it is possible to prevent the cost from increasing.

Also, although a mobile communication system for providing a function of mobile communication to a mobile communication terminal is provided in the above-described embodiment, it is unnecessary for the present invention to be the mobile communication system. The present invention can be applied to a fixed communication system for providing a function of fixed communication to a fixed communication terminal. The fixed communication terminal and the fixed communication system are different from the above-described mobile communication system and connected by wire. The above-described embodiment may be an embodiment of a fixed communication system according to the present invention if the mobile communication terminal is replaced with the fixed communication terminal, the mobile communication is replaced with the fixed communication, and the mobile communication system is replaced with the fixed communication system. However, in this case, a specific node is a node according to the fixed communication system. Also, the present invention can be executed in a communication system in which mobile communication and fixed communication are mixed.

That is, the present invention is not limited to the mobile communication terminal, the mobile communication, and the mobile communication system, but can be applied to any communication terminal, any communication, and any communication system as long as a similar framework to the above-described embodiment is provided.

Also, although the reservation is performed before the generation of the VNF 70 in the above-described embodiment, it may be unnecessary to perform the reservation.

Also, a plurality of VIMs 40 for managing the virtualization resources of units in which the VNF 70 is implemented in the NFVI 60 in mutually different schemes may be configured to be included in the above-described management system 10. However, it is unnecessary to assume this configuration and a management system including a plurality of VIMs for managing the virtualization resources of units in which the VNF 70 is implemented in the NFVI 60 in one or more schemes may be assumed. Also, for a system (software), a version is updated even in the same product. Even in the case in which one VIM is connected to a plurality of VNFMs having different schemes, a plurality of VNFMs of a connection partner may require revision according to version update of the VIM. Even in this case, it is possible to maintain influenced portions in one place of the orchestrator by applying a scheme of the present embodiment via the orchestrator, so that efficiency is improved.

REFERENCE SIGNS LIST

1 Mobile communication system
10 Management system
20 Orchestrator
21 Request reception section
22 Reservation request section
23 Virtual server generation request section
30 VNFM
31 Retention section
32 Detailed information output section
40 VIM
41 Monitoring section
42 Reservation section
43 Virtual server generation section
50 OSS/BSS
51 OSS
60 NFVI
70 VNF
80 EMS
101 CPU
102 RAM
103 ROM
104 Communication module
105 Auxiliary storage apparatus

The invention claimed is:

1. A management system which is included in a communication system configured to include virtualization resources including a physical server in which a virtual server for executing a communication process is generated and which includes a virtual communication-function management node for managing a function of executing the communication process provided in the virtual server, a plurality of virtualization resource management nodes for managing the virtualization resources in mutually different schemes, and an overall management node for managing all the virtualization resources,
    wherein at least one of the virtualization resource management nodes includes circuitry configured to:
        monitor a use state of the virtualization resources;
        perform reservation by receiving a request of the reservation of necessary resources for generation of the virtual server among the virtualization resources; and
        generate the virtual server by receiving a request for generating the virtual server on the necessary resources for the generation of the virtual server reserved,
    wherein the virtual communication-function management node includes circuitry configured to:
        retain detailed information for implementing the virtual server on the virtualization resources; and
        output the detailed information retained to the overall management node,
    wherein the overall management node includes circuitry configured to:
        receive a request related to a function of the communication process accompanied by the generation of the virtual server in the physical server, and
        input the detailed information from the virtual communication-function management node, rewrite the input detailed information according to a scheme in which one of the plurality of virtualization resource management nodes manages the virtualization resources, and request the one of the plurality of virtualization resource management nodes to generate the virtual server on the necessary resources reserved using the rewritten detailed information, wherein the virtual communication-function management node is not configured to perform a process in accordance with the schemes, and the schemes, in which the plurality of virtualization resource management nodes manage the virtualization resources, include OPENSTACK or vCenter, and
    wherein the management system:
        calculates the necessary resources for the generation of the virtual server on the basis of the request received and the use state of the virtualization resources monitored and requests the virtualization resource management node to perform the reservation, and
    wherein the overall management node, the virtual communication-function management node, and the virtualization resource management node are an orchestrator, virtual network function manager (VNFM), and virtual infrastructure manager (VIM), respectively, which constitute a core network of a mobile communication network.

2. The management system according to claim 1, wherein the virtual server is constituted of one or more internal functional sections, and the detailed information includes correspondence relationships among resources of each internal functional section and an image file used when starting up the virtual server.

3. The management system according to claim 1, wherein the detailed information includes the design know-how of a vendor which provides the mobile communication network.

4. An overall management node in a management system which is included in a communication system configured to include virtualization resources including a physical server in which a virtual server for executing a communication process is generated and wherein the management system includes a virtual communication-function management node for managing a function of executing the communication process provided in the virtual server, a plurality of virtualization resource management nodes for managing the virtualization resources in mutually different schemes, and the overall management node for managing all the virtualization resources, wherein the overall management node, virtual communication-function management node, and the virtualization resource management node are an orchestrator, virtual network function manager (VNFM), and virtual infrastructure manager (VIM), respectively, which constitute a core network of a mobile communication network, the overall management node comprising circuitry configured to:
    receive a request related to a function of the communication process accompanied by the generation of the virtual server in the physical server, and
    input detailed information for implementing the virtual server on the virtualization resources from the virtual communication-function management node, rewrite the input detailed information according to a scheme in which one of the plurality of virtualization resource management nodes manages the virtualization resources, and request the one of the plurality of virtualization resource management nodes to generate the virtual server on reserved resources necessary for the generation of the virtual server using the rewritten detailed information,
    wherein the virtual communication-function management node is not configured to perform a process in accordance with the schemes, and the schemes, in which the plurality of virtualization resource management nodes manage the virtualization resources, include OPENSTACK or vCenter.

5. A management method which is a method of operating a management system which is included in a communication system configured to include virtualization resources including a physical server in which a virtual server for executing a communication process is generated and wherein the management system includes a virtual communication-function management node for managing a function of executing the communication process provided in the virtual server, a plurality of virtualization resource management nodes for managing the virtualization resources in mutually different schemes, and an overall management node for managing all the virtualization resources,
    wherein the virtual communication-function management node includes circuitry configured to retain detailed information for implementing the virtual server on the virtualization resources, and
    wherein the management method includes:
        a monitoring step of monitoring, by at least one of the virtualization resource management nodes, a use state of the virtualization resources;
        a reservation step of performing, by the virtualization resource management node, reservation by receiving a request of the reservation of necessary resources for generation of the virtual server among the virtualization resources;

a virtual server generation step of generating, by the virtualization resource management node, the virtual server by receiving a request for generating the virtual server on the necessary resources for the generation of the virtual server reserved in the reservation step;

a detailed information output step of outputting, by the virtual communication-function management node, the detailed information retained to the overall management node;

a request reception step of receiving, by the overall management node, a request related to a function of the communication process accompanied by the generation of the virtual server in the physical server;

a virtual server generation request step of inputting, by the overall management node, the detailed information from the virtual communication-function management node, rewriting the input detailed information according to a scheme in which one of the plurality of virtualization resource management nodes manages the virtualization resources, and requesting the one of the plurality of virtualization resource management nodes to generate the virtual server on the necessary resources reserved in the reservation step using the rewritten detailed information, wherein the virtual communication-function management node is not configured to perform a process in accordance with the schemes, and the schemes, in which the plurality of virtualization resource management nodes manage the virtualization resources, include OPENSTACK or vCenter; and a reservation request step of calculating, by the management system, the necessary resources for the generation of the virtual server on the basis of the request received in the request reception step and the use state of the virtualization resources monitored in the monitoring step and requesting the virtualization resource management node to perform the reservation, wherein the overall management node, the virtual communication-function management node, and the virtualization resource management node are an orchestrator, virtual network function manager (VNFM), and virtual infrastructure manager (VIM), respectively, which constitute a core network of a mobile communication network.

6. A management method which is a method of operating an overall management node in a management system which is included in a communication system configured to include virtualization resources including a physical server in which a virtual server for executing a communication process is generated and wherein the management system includes a virtual communication-function management node for managing a function of executing the communication process provided in the virtual server, a plurality of virtualization resource management nodes for managing the virtualization resources in mutually different schemes, and the overall management node for managing all the virtualization resources, wherein the overall management node, the virtual communication-function management node, and the virtualization resource management node are an orchestrator, virtual network function manager (VNFM), and virtual infrastructure manager (VIM), respectively, which constitute a core network of a mobile communication network, the management method comprising:

a request reception step of receiving a request related to a function of the communication process accompanied by the generation of the virtual server in the physical server; and a virtual server generation request step of inputting detailed information for implementing the virtual server on the virtualization resources from the virtual communication-function management node, rewriting the input detailed information according to a scheme in which one of the plurality of virtualization resource management nodes manages the virtualization resources, and requesting the one of the plurality of virtualization resource management nodes to generate the virtual server on the reserved resources necessary for the generation of the virtual server among the virtualization resources using the rewritten detailed information, wherein the virtual communication-function management node is not configured to perform a process in accordance with the schemes, and the schemes, in which the plurality of virtualization resource management nodes manage the virtualization resources, include OPENSTACK or vCenter.

* * * * *